(12) United States Patent
Kim et al.

(10) Patent No.: US 11,989,967 B2
(45) Date of Patent: May 21, 2024

(54) DISPLAY DEVICE HAVING FINGERPRINT SENSING FUNCTION, ELECTRONIC DEVICE INCLUDING THE SAME, AND OPERATION METHOD THEREOF

(71) Applicant: Samsung Display Co., Ltd., Yongin-si (KR)

(72) Inventors: Chul Kim, Hwaseong-si (KR); Keumdong Jung, Seoul (KR); KyungTea Park, Seoul (KR); Sunhwa Lee, Yongin-si (KR); Mukyung Jeon, Ulsan (KR); Sanghyun Heo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/210,607

(22) Filed: Jun. 15, 2023

(65) Prior Publication Data

US 2023/0326229 A1    Oct. 12, 2023

Related U.S. Application Data

(63) Continuation of application No. 17/892,107, filed on Aug. 21, 2022, now Pat. No. 11,715,320, and a
(Continued)

(30) Foreign Application Priority Data

Apr. 3, 2019    (KR) .................. 10-2019-0038997

(51) Int. Cl.
*G06V 40/13* (2022.01)
*G06F 3/041* (2006.01)
*G06V 40/12* (2022.01)

(52) U.S. Cl.
CPC ............ *G06V 40/13* (2022.01); *G06F 3/0416* (2013.01); *G06V 40/1365* (2022.01)

(58) Field of Classification Search
None
See application file for complete search history.

(56) References Cited

U.S. PATENT DOCUMENTS

| 9,864,897 | B2 | 1/2018 | Ding et al. |
| 11,080,503 | B2 | 8/2021 | Hu |
| (Continued) | | | |

FOREIGN PATENT DOCUMENTS

| CN | 108256416 | 7/2018 |
| EP | 3686720 | 7/2020 |
| (Continued) | | |

OTHER PUBLICATIONS

Extended European Search Report dated Aug. 27, 2020 in European Patent Application No. 20166829.0.
(Continued)

*Primary Examiner* — Nicholas J Lee
(74) *Attorney, Agent, or Firm* — Lewis Roca Rothgerber Christie LLP

(57) ABSTRACT

A display device relating to a method of operating thereof, including: a display panel having a touch sensing unit to sense an external touch and a display unit including a plurality of pixels; a fingerprint sensing panel to sense a fingerprint disposed on one surface of the display unit, the fingerprint sensing panel having a plurality of fingerprint sensing pixels respectively connected to a plurality of fingerprint scan lines and a plurality of fingerprint sensing lines, and a fingerprint scan driving circuit to drive one or more fingerprint scan lines included in a sensing area; and a read-out circuit to output a selection signal for selecting a sensing area of the fingerprint sensing panel.

15 Claims, 28 Drawing Sheets

Related U.S. Application Data continuation of application No. 16/838,689, filed on Apr. 2, 2020, now Pat. No. 11,423,684.

(56) References Cited

U.S. PATENT DOCUMENTS

| | | |
|---|---|---|
| 2003/0156744 A1 | 8/2003 | Hashimoto |
| 2017/0098113 A1 | 4/2017 | Lee et al. |
| 2017/0351364 A1 | 12/2017 | Kim et al. |
| 2018/0114047 A1 | 4/2018 | Kim et al. |
| 2018/0224999 A1 | 8/2018 | Lee et al. |
| 2019/0012518 A1 | 1/2019 | Yang |
| 2019/0079628 A1 | 3/2019 | Liu et al. |
| 2020/0210065 A1 | 7/2020 | Chen et al. |

FOREIGN PATENT DOCUMENTS

| | | |
|---|---|---|
| KR | 10-2018-0044129 | 5/2018 |
| KR | 10-2018-0090503 | 8/2018 |

OTHER PUBLICATIONS

Non-Final Office Action dated Mar. 4, 2021, in U.S. Appl. No. 16/838,689.
Final Office Action dated Jun. 24, 2021, in U.S. Appl. No. 16/838,689.
Non-Final Office Action dated Oct. 1, 2021, in U.S. Appl. No. 16/838,689.
Notice of Allowance dated Apr. 11, 2022, in U.S. Appl. No. 16/838,689.
European Examination Report dated Sep. 9, 2022, in European Patent Application No. 20166829.

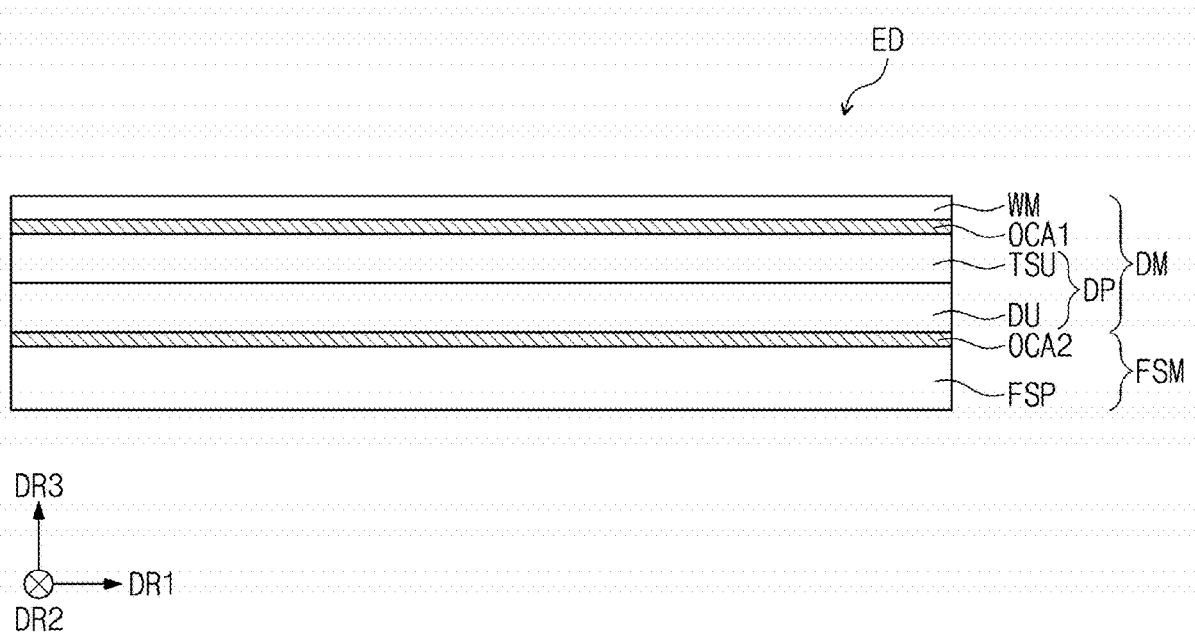

DISPLAY DEVICE HAVING FINGERPRINT SENSING FUNCTION, ELECTRONIC DEVICE INCLUDING THE SAME, AND OPERATION METHOD THEREOF

CROSS-REFERENCE TO RELATED APPLICATIONS

This application is a Continuation of U.S. patent application Ser. No. 17/892,107, filed on Aug. 21, 2023, which is a Continuation of U.S. patent application Ser. No. 16/838,689, filed on Apr. 2, 2020, issued as U.S. Pat. No. 11,423,684, which claims priority from and the benefit of Korean Patent Application No. 10-2019-0038997, filed on Apr. 3, 2019, each of which is hereby incorporated by reference for all purposes as if fully set forth herein.

BACKGROUND

Field

The invention relates generally to electronic devices and, more particularly, to a display panel having a fingerprint sensing function and a display device including the same.

Discussion of the Background

Multimedia electronic devices such as a television, a mobile phone, a tablet computer, a navigation device, a game console, and the like have a display device for displaying an image. The electronic devices may include a touch display device capable of providing a touch-based input method that allows a user to easily input information or commands intuitively and conveniently in addition to a typical input method such as a button, a keyboard, and a mouse.

Recently, electronic devices have being used for online banking, product purchase, and security applications in which sensitive personal and/or financial information must be protected. Accordingly, some electronic devices utilize a fingerprint, which provides unique biometric information, as a user authentication means for online banking, product purchase, security applications, etc. As applications using sensitive personal and/or financial information are increasing, there is an increasing demand for a touch display device having a fingerprint recognition function.

The above information disclosed in this Background section is only for understanding of the background of the inventive concepts, and, therefore, it may contain information that does not constitute prior art.

SUMMARY

Applicant realized that electronic devices with fingerprint recognition may be limited in that the fingerprint recognition function is confined to a predetermined space on the display.

Display devices and electronic devices including the same constructed according to the principles and exemplary embodiments of the invention are capable of sensing a fingerprint on substantially the entire front surface thereof. The electronic device may increase the brightness of the display area corresponding to the sensing area, thereby improving the fingerprint recognition performance. Also, the signal processing amount may be minimized by receiving a fingerprint sensing signal from the sensing area corresponding to the user's touch area.

Display devices and electronic devices including the same constructed according to the principles and exemplary embodiments of the invention may use a combination of sensing lines and scanning lines to detect a finger touch and sequentially drive the scan lines to create a new fingerprint signal and compare the signal to a fingerprint image stored in memory.

Additional features of the inventive concepts will be set forth in the description which follows, and in part will be apparent from the description, or may be learned by practice of the inventive concepts.

According to one aspect of the invention, a display device includes: a display panel having a touch sensing unit to sense an external touch and a display unit including a plurality of pixels; a fingerprint sensing panel to sense a fingerprint disposed on one surface of the display unit, the fingerprint sensing panel having a plurality of fingerprint sensing pixels respectively connected to a plurality of fingerprint scan lines and a plurality of fingerprint sensing lines, and a fingerprint scan driving circuit to drive one or more fingerprint scan lines included in a sensing area; and a read-out circuit to output a selection signal for selecting a sensing area of the fingerprint sensing panel.

The fingerprint sensing panel may include a plurality of sensing units, where each of the plurality of sensing units may include x fingerprint sensing pixels adjacent to each other in a first direction and y fingerprint sensing pixels adjacent to each other in a second direction where each of x and y can be, independently, a natural number, and the sensing area may have at least one of the plurality of sensing units.

The fingerprint scan driving circuit may include a plurality of scan blocks respectively corresponding to the plurality of sensing units arranged in the second direction, and each of the plurality of scan blocks may sequentially drive the one or more fingerprint scan lines in a corresponding sensing unit among the plurality of sensing units in response to a block selection signal.

Each of the scan blocks may include a plurality of switching elements respectively corresponding to the one or more fingerprint scan lines; and a plurality of stages respectively corresponding to the one or more fingerprint scan lines to output a fingerprint scan signal to a corresponding fingerprint scan line, where a first switching element may transfer the block selection signal to a corresponding stage in response to a block clock signal, and a h-th switching element where h may be a positive integer greater than 1 may transfer a fingerprint scan signal outputted from a (h−1)-th stage to corresponding stages in response to the block clock signal.

The read-out circuit may receive a fingerprint sensing signal from one of the plurality of fingerprint sensing lines.

The read-out circuit may have a plurality of read-out blocks respectively corresponding to the plurality of sensing units arranged in the first direction; and a control circuit to output the block selection signal and a reception selection signal, where each of the plurality of read-out blocks may receive the fingerprint sensing signal from the fingerprint sensing lines in a sensing unit included in the sensing area in response to the reception selection signal.

The display unit may have a display area in which the pixels can be arranged and a non-display area adjacent to the display area, and the plurality of fingerprint sensing pixels of the fingerprint sensing panel may be arranged in a fingerprint sensing area overlapping the display area.

The fingerprint sensing panel may be configured to sense a fingerprint disposed substantially anywhere on the one surface of the display unit and the one or more fingerprint scan lines may be sequentially driven.

According to another aspect of the invention, an electronic device includes: a display unit including a plurality of pixels; a panel driving circuit to drive the display unit; a touch sensing unit disposed on the display unit to sense an external touch; a touch sensing control circuit to drive the touch sensing unit; a fingerprint sensing panel disposed on one surface of the display unit to sense a fingerprint; a read-out circuit to drive the fingerprint sensing panel; and a control module to control the panel driving circuit, the touch sensing control circuit, and the read-out circuit, where when a touch sensing signal corresponding to an arbitrary touch area is received from the touch sensing control circuit, the control module controls the panel driving circuit so that a brightness of a light emitting area of the display unit becomes a predetermined level, and controls the read-out circuit to sense a fingerprint from a sensing area of the fingerprint sensing panel, where the touch area, the light emitting area, and the sensing area overlap each other.

The fingerprint sensing panel may include a plurality of fingerprint sensing pixels respectively connected to a plurality of fingerprint scan lines and a plurality of fingerprint sensing lines; and a fingerprint scan driving circuit to may sequentially drive fingerprint scan lines included in the sensing area.

The read-out circuit may be configured to output a block selection signal to select the sensing area, and to receive a fingerprint sensing signal from fingerprint sensing lines included in the sensing area.

The read-out circuit may be configured to perform an authentication process to compare the fingerprint sensing signal with a stored fingerprint signal, and to provide an authentication result to the control module.

The display unit may further include a plurality of scan lines and a plurality of data lines respectively connected to the plurality of pixels, one frame may have an active period in which the plurality of scan lines may be sequentially driven, and a blank period, and the control module may be configured to control the read-out circuit to receive the fingerprint sensing signal from fingerprint sensing lines included in the sensing area during the blank period.

The fingerprint sensing panel may include a plurality of sensing units, each of the plurality of sensing units can include x fingerprint sensing pixels adjacent to each other in a first direction and y fingerprint sensing pixels adjacent to each other in a second direction where each of x and y may be, independently, a natural number, and the sensing area may include at least one of the plurality of sensing units.

The fingerprint scan driving circuit may include a plurality of scan blocks respectively corresponding to the plurality of sensing units arranged in the second direction, and each of the plurality of scan blocks may sequentially drive the fingerprint scan lines in a corresponding sensing unit in response to the block selection signal.

Each of the scan blocks may include: a plurality of switching elements respectively corresponding to the plurality of fingerprint scan lines; and a plurality of stages respectively corresponding to the plurality of fingerprint scan lines to output a fingerprint scan signal to a corresponding fingerprint scan line, where a first switching element transfers the block selection signal to a corresponding stage in response to a block clock signal, a h-th switching element where h may be a positive integer greater than 1 transfers a fingerprint scan signal output from a (h−1)-th stage to corresponding in response to the block clock signal.

The display unit may include a display area in which the pixels can be arranged and a non-display area adjacent to the display area, and the plurality of fingerprint sensing pixels of the fingerprint sensing panel may be arranged in a fingerprint sensing area overlapping the display area.

The control module may be configured to receive a fingerprint signal from the read-out circuit and to perform an authentication process to compare the received fingerprint signal with a stored fingerprint signal.

The control module may control a brightness of the light emitting area to a first level when the touch sensing signal can be received, where the control module may increase a brightness of the light emitting area step by step from the first level when the fingerprint signal received from the read-out circuit and the stored fingerprint signal may be different from each other.

When a position of the sensing area may be determined before a touch sensing signal corresponding to an arbitrary touch area may be received from the touch sensing control circuit, the control module can control the panel driving circuit so that a brightness of the light emitting area corresponding to the sensing area may become the predetermined level, and may control the read-out circuit to sense a fingerprint from the sensing area.

The fingerprint sensing panel may further include a plurality of pads disposed in a peripheral area adjacent to the fingerprint sensing area, and may further include a circuit board electrically connected to the fingerprint sensing panel through the pads, and the read-out circuit may be disposed on the circuit board.

According to a further aspect of the invention, a display device includes: a display panel including a touch sensing unit to sense an external touch and a display unit including a plurality of pixels; a fingerprint sensing panel disposed on one surface of the display unit and including a plurality of fingerprint sensing pixels respectively connected to a plurality of fingerprint scan lines and a plurality of fingerprint sensing lines; and a fingerprint scan driving circuit to drive the plurality of fingerprint scan lines, where the fingerprint scan driving circuit selectively drives at least one of the plurality of fingerprint scan lines in response to a block selection signal and maintains unselected fingerprint scan lines in an inactive level.

The fingerprint sensing panel may include a plurality of sensing units including x fingerprint sensing pixels adjacent to each other in a first direction and y fingerprint sensing pixels adjacent to each other in a second direction where each of x and y may be, independently, a natural number.

The fingerprint scan driving circuit may include a plurality of scan blocks respectively corresponding to the plurality of sensing units arranged in the second direction, where each of the plurality of scan blocks may sequentially drive the fingerprint scan lines connected to the fingerprint sensing pixels in a corresponding sensing unit in response to the block selection signal.

A read-out circuit may select some of the plurality of sensing units as a sensing area and may provide the block selection signals corresponding to a selected sensing area, and the read-out circuit may be configured to receive a fingerprint sensing signal from each of the fingerprint sensing lines connected to the fingerprint sensing pixels in the sensing area.

The read-out circuit may include a plurality of read-out blocks respectively corresponding to the plurality of sensing units arranged in the first direction, each of the plurality of read-out blocks corresponding to the sensing area may be configured to receive a fingerprint sensing signal from each of fingerprint sensing lines connected to fingerprint sensing pixels in a corresponding sensing unit, and each of plurality of read-out blocks not corresponding to the sensing area may be configured to maintain an inactive state.

According to still another aspect of the invention, a method of operating an electronic device including a touch sensing unit, a display unit, and a fingerprint sensing panel, includes the steps of: receiving a touch sensing signal from the touch sensing unit; defining a touch area corresponding to the touch sensing signal; increasing a light emission brightness of a light emitting area of the display unit corresponding to the touch area; generating a block selection signal to select a sensing area of the fingerprint sensing panel corresponding to the touch area to the fingerprint sensing panel; and driving a fingerprint scan line connected to a fingerprint sensing pixel in the sensing area of the fingerprint sensing panel in response to the block selection signal.

The fingerprint sensing panel can include: a plurality of fingerprint sensing pixels respectively connected to a plurality of fingerprint scan lines and a plurality of fingerprint sensing lines; and a fingerprint scan driving circuit to sequentially drive the plurality of fingerprint scan lines, where the fingerprint sensing panel may include a plurality of sensing units, each of the plurality of sensing units may include x fingerprint sensing pixels adjacent to each other in a first direction and y fingerprint sensing pixels adjacent to each other in a second direction among the plurality of fingerprint sensing pixels where each of x and y may be, independently, a natural number, and the sensing area may include at least one of the plurality of sensing units.

The fingerprint scan driving circuit may include a plurality of scan blocks respectively corresponding to the plurality of sensing units arranged in the second direction, where the step of generating of the block selection signal may include: selecting at least one scan block corresponding to the sensing area among the plurality of scan blocks in response to the block selection signal; and sequentially driving fingerprint scan lines corresponding to the at least one selected scan block.

The step of receiving a fingerprint signal may be from the sensing area of the fingerprint sensing panel.

The step of comparing the fingerprint signal may be with a preset fingerprint signal.

When the fingerprint signal and the preset fingerprint signal may be different from each other, increasing a light emission brightness of a light emitting area may correspond to the touch area of the display unit; generating a block selection to sense a sensing area may correspond to the touch area of the fingerprint sensing panel; and receiving a new fingerprint signal may be from the sensing area of the fingerprint sensing panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 1C is a cross-sectional view of the electronic device of FIG. 1A;

DETAILED DESCRIPTION

Figure 1A:
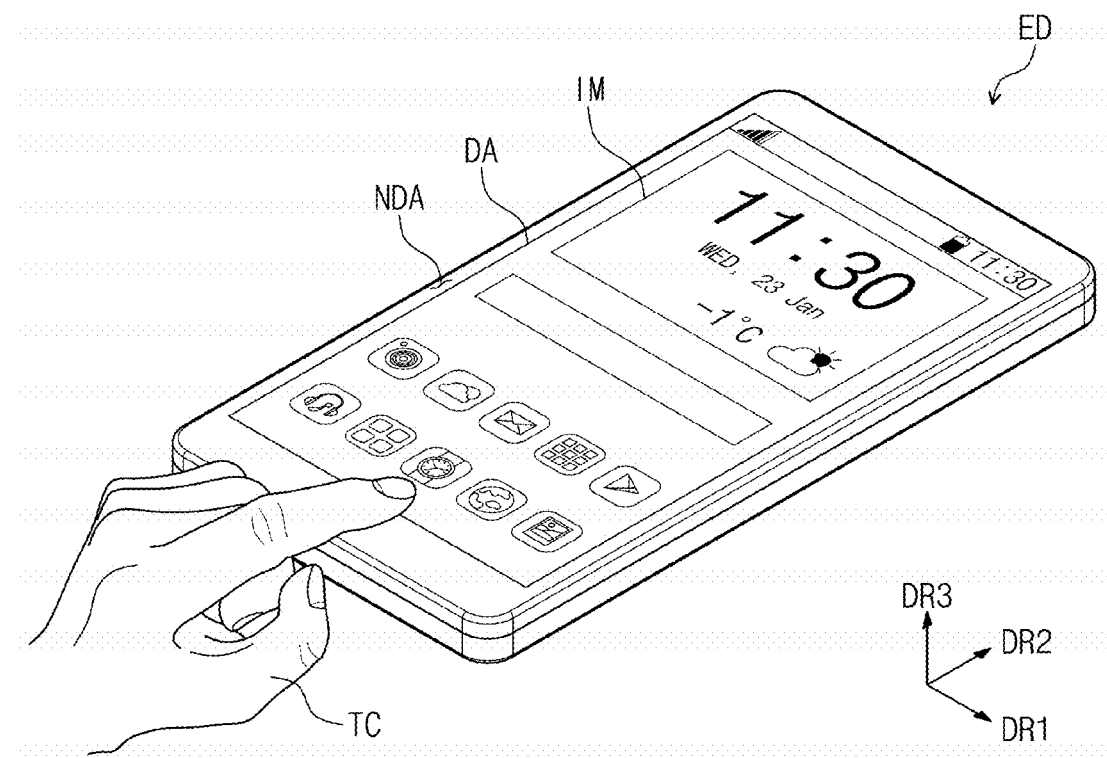
FIG. 1A is a perspective view of an exemplary embodiment of an electronic device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, properties, regions, fixed numbers, processes, steps, operations, elements, components, and/or groups thereof, but do not preclude the presence or addition of one or more other features, integers, properties, regions, fixed numbers, processes, steps, operations, elements, components, and/or groups thereof. The term "and/or" includes all of one or more combinations defined by related components. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

In exemplary embodiments, the modules as depicted in FIGS. 12-13, 19A-B, 20A-B, and 21A-B, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the modules as depicted in FIGS. 12-13, 19A-B, 20A-B, and 21A-B, and/or one or more components thereof may include or otherwise be associated with one or more memories including code (e.g., instructions) configured to cause the modules as depicted in FIGS. 12-13, 19A-B, 20A-B, and 21A-B, and/or one or more components thereof to perform one or more of the features, functions, processes, etc., described herein.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
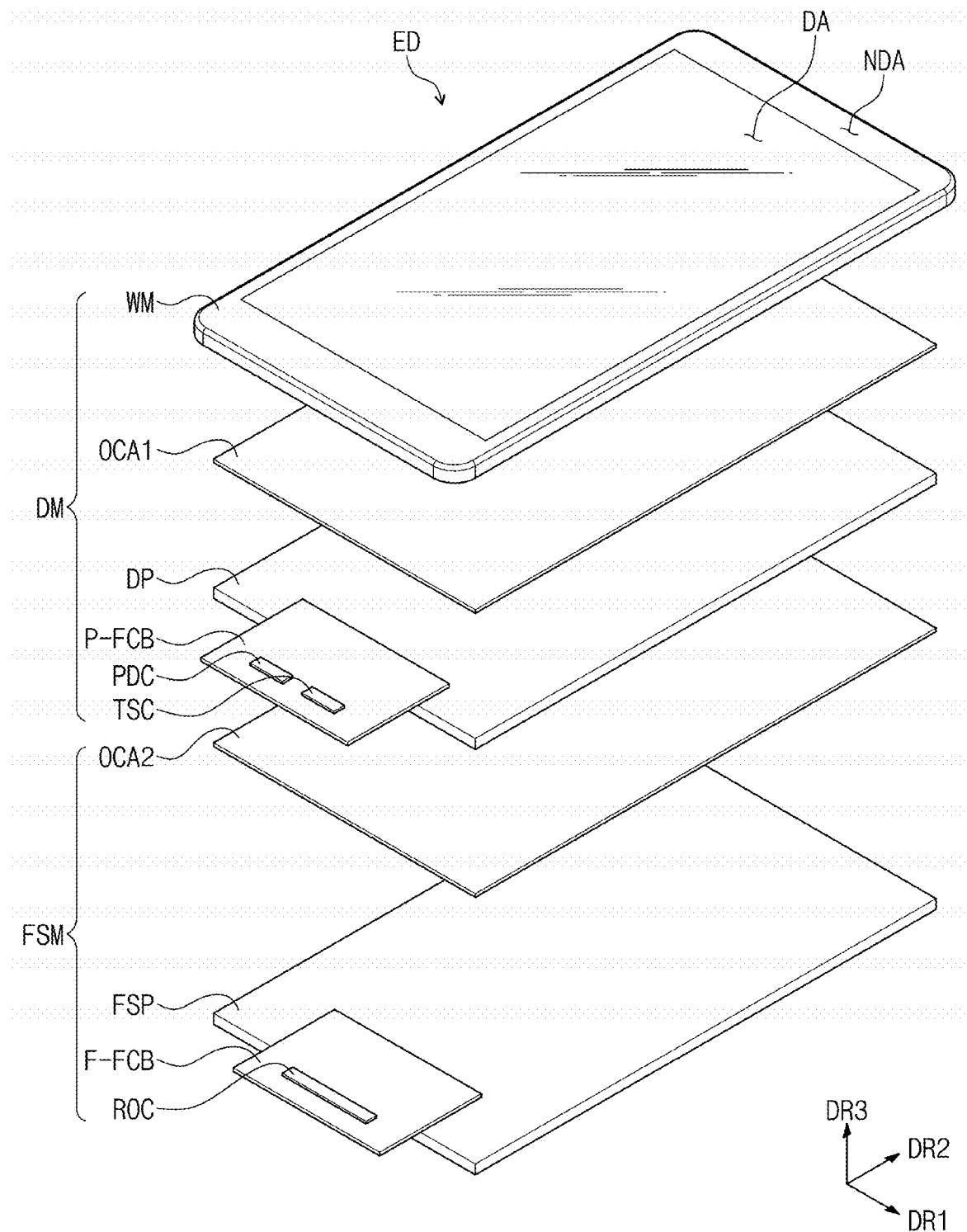
FIG. 1B is an exploded perspective view of the electronic device of FIG. 1A.

FIG. 1A is a perspective view of an exemplary embodiment of an electronic device constructed according to principles of the invention. FIG. 1B is an exploded perspective view of the electronic device of FIG. 1A. FIG. 1C is a cross-sectional view of the electronic device of FIG. 1A.

Referring to FIG. 1A, a portable terminal is shown as an example of an electronic device ED (which may be referred to herein as a "display device") according to an exemplary embodiment of the invention. The portable terminal may include a tablet PC, a smart phone, a Personal Digital Assistant (PDA), a Portable Multimedia Player (PMP), a game console, a wristwatch type electronic device, and the like. However, the exemplary embodiments are not limited thereto.

Exemplary embodiments of the invention may be used for large-sized electronic equipment such as a TV or an external billboard, and may also be used for small-sized electronic equipment such as a personal computer, a notebook computer, a car navigation unit, and a camera. These are simply suggested as embodiments and it is apparent that they may be employed in other electronic devices.

As shown in FIG. 1A, the display surface where the image IM is displayed is generally parallel to the plane defined by a first direction DR1 and a second direction DR2. The electronic device ED includes a plurality of areas that are distinguished on the display surface. The display surface includes a display area DA for displaying the image IM and a non-display area NDA adjacent to the display area DA. The non-display area NDA may be referred to as a bezel area. As one example, the display area DA may have a generally rectangular form. The non-display area NDA may surround the display area DA. Also, the electronic device ED may have a partially generally curved shape. As a result, one area of the display area DA may have a generally curved shape.

The front surface (or upper surface or first surface) and the rear surface (or lower surface or second surface) of each member are defined based on the direction in which the image IM is displayed. However, the directions that the first to third directions DR1, DR2, and DR3 indicate may be converted to other directions as a relative concept. Hereinafter, first to third directions as directions that the respective first to third directions DR1, DR2, and DR3 indicate refer to the same reference numerals.

The electronic device ED according to an exemplary embodiment of the invention may sense a touch input TC of a user applied from the outside. The user's inputs include various types of external inputs such as a part of the user's body, light, heat, or pressure. In this embodiment, it is assumed that the user's input is the user's hand applied to the front surface but this is exemplary. As described above, the user's touch input TC may be provided in various forms. Also, the electronic device ED may sense a user's input applied to a side surface or a rear surface of the electronic device ED according to the structure of the electronic device ED, and is not limited to any one embodiment.

As shown in FIG. 1B, the electronic device ED includes a display module DM and a fingerprint sensing module FSM. The display module DM includes a window member WM, a first adhesive member OCA1, a display panel DP, a panel circuit board P-FCB, a panel driving circuit PDC and a touch sensing circuit TSC.

The window member WM provides a front surface of the electronic device ED shown in FIG. 1A. The window member WM may include a glass substrate, a sapphire substrate, a plastic substrate, or the like. In addition, the window member WM may include a functional coating layer such as an anti-fingerprint layer, an anti-reflection layer, and a hard coating layer. In this exemplary embodiment, a flat type window member WM is shown in the display area DA, but the shape of the window member WM may be modified. The facing edges in the first direction DR1 of the window member WM may provide a curved surface.

The display panel DP is disposed on the rear surface of the window member WM to generate an image IM. In addition, the display panel DP may sense a user input (e.g., user touch and/or pressure of a user). In this embodiment, although the display panel DP providing a flat display surface is exemplarily shown, the shape of the display panel DP may be modified. The facing edges in the first direction DR1 of the display panel DP may be bent from the central portions to provide a generally curved surface.

The display panel DP may include various display elements. For example, the display element may be a liquid crystal capacitor, an organic light emitting element, an electrophoretic element, or an electrowetting element. The display device according to one exemplary embodiment is described as being a plurality of organic light emitting diodes. Exemplary embodiments of the display panel DP of the invention may be a flexible display panel, for example, an organic light emitting display panel.

The first adhesive member OCA1 is disposed between the window member WM and the display panel DP. The first adhesive member OCA1 may be an optical transparent adhesive member.

One end of the panel circuit board P-FCB may be bonded on the pads disposed in one area of the display panel DP and thus may be electrically connected to the display panel DP. According to one embodiment, the panel driving circuit PDC and the touch sensing circuit TSC may be mounted on the panel circuit board P-FCB in a chip on film (COF) manner. Moreover, a plurality of passive elements and active elements may be further mounted on the panel circuit board P-FCB. The panel circuit board P-FCB may provide an electrical signal to the display panel DP through the signal lines. The panel circuit board P-FCB may be implemented with a flexible printed circuit. The other end of the panel circuit board P-FCB may be electrically connected to other components of the electronic device ED shown in FIG. 1A.

The fingerprint sensing module FSM is disposed on the rear surface of the display panel DP and includes a second adhesive member OCA2, a fingerprint sensing panel FSP, a fingerprint circuit board F-FCB and a read-out circuit ROC. In the illustrated exemplary embodiment, the fingerprint sensing module FSM is shown and described as being disposed on the rear surface of the display panel DP, but the exemplary embodiments are not limited thereto. For example, the fingerprint sensing module FSM may be disposed on the upper surface of the display panel DP.

The second adhesive member OCA2 is disposed between the display panel DP and the fingerprint sensing panel FSP. The second adhesive member OCA2 may be an optical transparent adhesive member.

Although FIG. 1B shows that the first adhesive member OCA1 is included in the display module DM and the second adhesive member OCA2 is included in the fingerprint sensing module FSM, the exemplary embodiments are not limited thereto.

After the light emitted from the display panel DP is emitted to the outside through the window member WM, the fingerprint sensing panel FSP may sense the amount of light reflected by the user's hand and thus may sense the user's fingerprint information.

One end of the fingerprint circuit board F-FCB may be bonded on the pads disposed in one area of the fingerprint sensing panel FSP and thus may be electrically connected to the fingerprint sensing panel FSP. According to one embodiment, the read-out circuit ROC may be mounted on the fingerprint circuit board F-FCB in a chip on film (COF) manner. Moreover, a plurality of passive elements and active elements may be further mounted on the fingerprint circuit board F-FCB. The fingerprint circuit board F-FCB may provide an electrical signal to the fingerprint sensing panel FSP through signal lines and may receive a fingerprint sensing signal from the fingerprint sensing panel FSP. The fingerprint circuit board F-FCB may be implemented with a flexible printed circuit. The other end of the fingerprint circuit board F-FCB may be electrically connected to other components of the electronic device ED shown in FIG. 1A.

In an exemplary embodiment, the panel circuit board P-FCB and the fingerprint circuit board F-FCB are disposed facing each other at one end of each of the display panel DP and the fingerprint sensing panel FSP, but the exemplary embodiments are not limited thereto. In another embodiment, the panel circuit board P-FCB and the fingerprint circuit board F-FCB may be apart from each other in the second direction DR2. That is, the panel circuit board P-FCB may be connected to one side of the display panel DP and the fingerprint circuit board F-FCB may be connected to the other side of the fingerprint sensing panel FSP corresponding to the other side of the display panel DP.

The electronic device ED shown in FIG. 1A includes various components for controlling the operations of the display module DM in addition to the display module DM and the fingerprint sensing module FSM shown in FIG. 1B. The circuit components of the electronic device ED will be described in detail later with reference to FIG. 2.

Referring to FIG. 1C, the electronic device ED of FIG. 1A includes a display module DM and a fingerprint sensing module FSM. The display module DM includes a window member WM, a first adhesive member OCA1, and a display panel DP. The display panel DP includes a touch sensing unit TSU and a display unit DU. In another embodiment, the stacking order of the touch sensing unit TSU and the display unit DU may be changed. In another embodiment, the window member WM may include an anti-reflection layer and a window layer.

Figure 2:
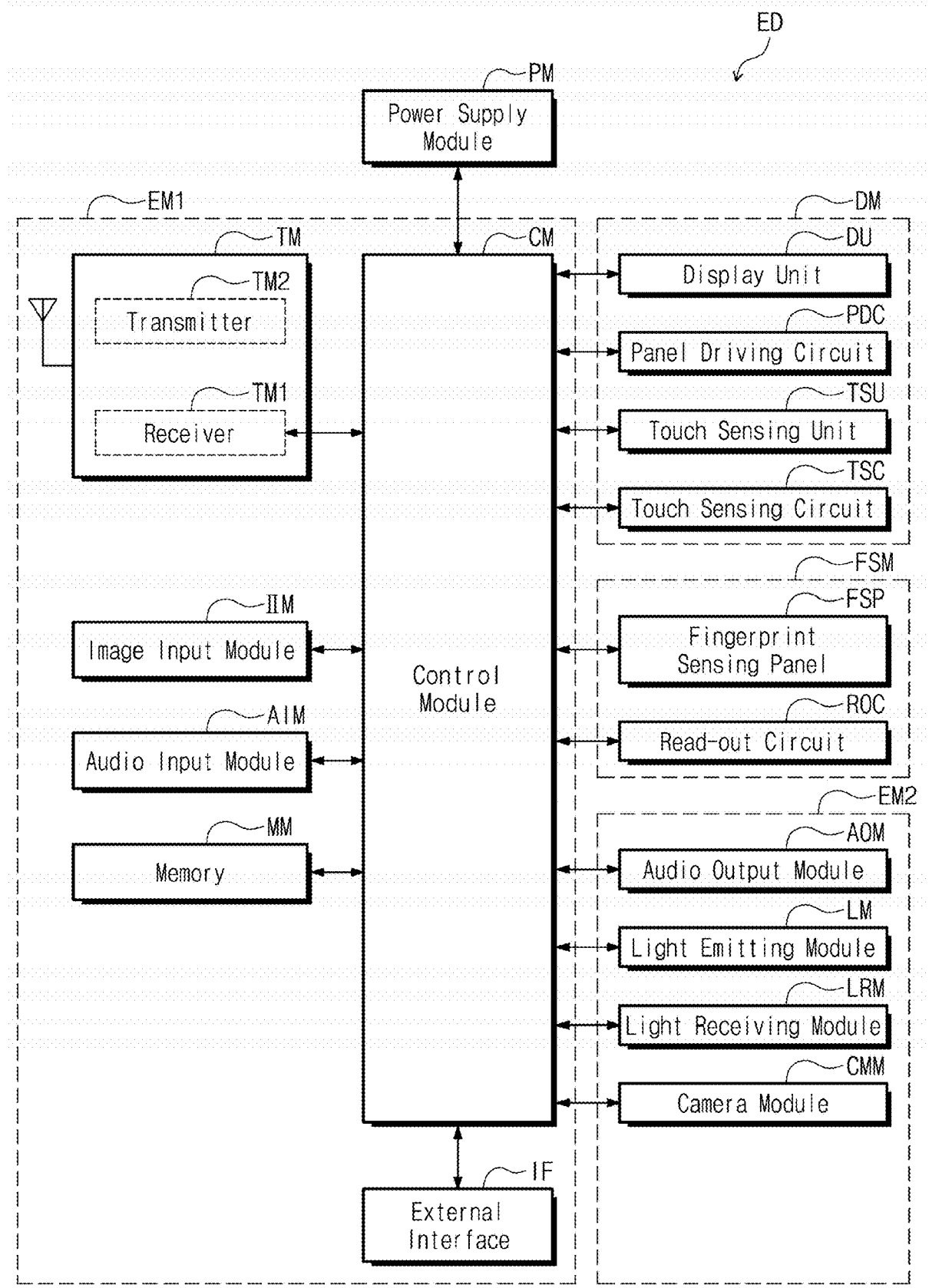
FIG. 2 is a block diagram of the exemplary electronic device shown in FIG. 1A.

FIG. 2 is a block diagram of the exemplary electronic device shown in FIG. 1A.

Referring to FIG. 2, the electronic device ED includes a display module DM, a power supply module PM, a first electronic module EM1, a second electronic module EM2, and a fingerprint sensing module FSM. The display module DM, the power supply module PM, the first electronic module EM1, the second electronic module EM2, and the fingerprint sensing module FSM may be electrically connected to each other. The display unit DU, the panel driving circuit PDC, the touch sensing unit TSU and the touch sensing circuit TSC in the configuration of the display module DM are illustratively shown in FIG. 2. Also, the fingerprint sensing panel FSP and the read-out circuit ROC in the configuration of the fingerprint sensing module FSM are illustratively shown in FIG. 2.

The power supply module PM supplies power necessary for the overall operation of the electronic device ED. The power supply module PM may include a typical battery module.

The first electronic module EM1 and the second electronic module EM2 include various functional modules for operating the electronic device ED. The first electronic module EM1 may be directly mounted on a motherboard electrically connected to the display module DM or may be mounted on a separate board and electrically connected to the motherboard through a connector or the like.

The first electronic module EM1 may include a control module CM, a wireless communication module TM, an image input module IIM, an audio input module AIM, a memory MM and an external interface IF. Some of the modules may not be mounted on the motherboard, but may be electrically connected to the motherboard through a flexible circuit board.

The control module CM controls the overall operation of the electronic device ED. The control module CM may be a microprocessor. For example, the control module CM activates or deactivates the display module DM. The control module CM may control other modules such as the image input module IIM and the audio input module AIM based on the touch signal received from the display module DM. The control module CM may perform user authentication based on the fingerprint signal received from the fingerprint sensing module FSM.

The wireless communication module TM may transmit/receive a wireless signal to/from another terminal using a Bluetooth or a Wi-Fi line. The wireless communication module TM may transmit/receive a voice signal using a general communication line. The wireless communication module TM includes a transmitter TM2 for modulating and transmitting a signal to be transmitted, and a receiver TM1 for demodulating the received signal.

The image input module TIM processes the image signal and converts it into image data that may be displayed on the display module DM. The audio input module AIM receives an external audio signal by a microphone in a recording mode, a voice recognition mode, etc., and converts it into electrical voice data.

The external interface IF serves as an interface to an external charger, a wired/wireless data port, a card socket (e.g., a memory card, a SIM/UIM card).

The second electronic module EM2 may include an audio output module AOM, a light emitting module LM, a light receiving module LRM, and a camera module CMM. The configurations may be directly mounted on the motherboard, or mounted on a separate substrate and electrically connected to the display module DM through a connector, or electrically connected to the first electronic module EM1.

The audio output module AOM converts the audio data received from the wireless communication module TM or the audio data stored in the memory MM and outputs the audio data to the outside.

The light emitting module LM generates and outputs light. The light emitting module LM may output infrared rays. The light emitting module LM may include an LED element. The light receiving module LRM may sense infrared rays. The light receiving module LRM may be activated when an infrared ray of a predetermined level or higher is sensed. The light receiving module LRM may include a CMOS sensor. After the infrared light generated by the light emitting module LM is outputted, the infrared light is reflected by an external object (e.g., a user finger or a face), and the reflected infrared light may be incident on the light receiving module LRM. The camera module CMM captures an image of the outside.

Figure 3:
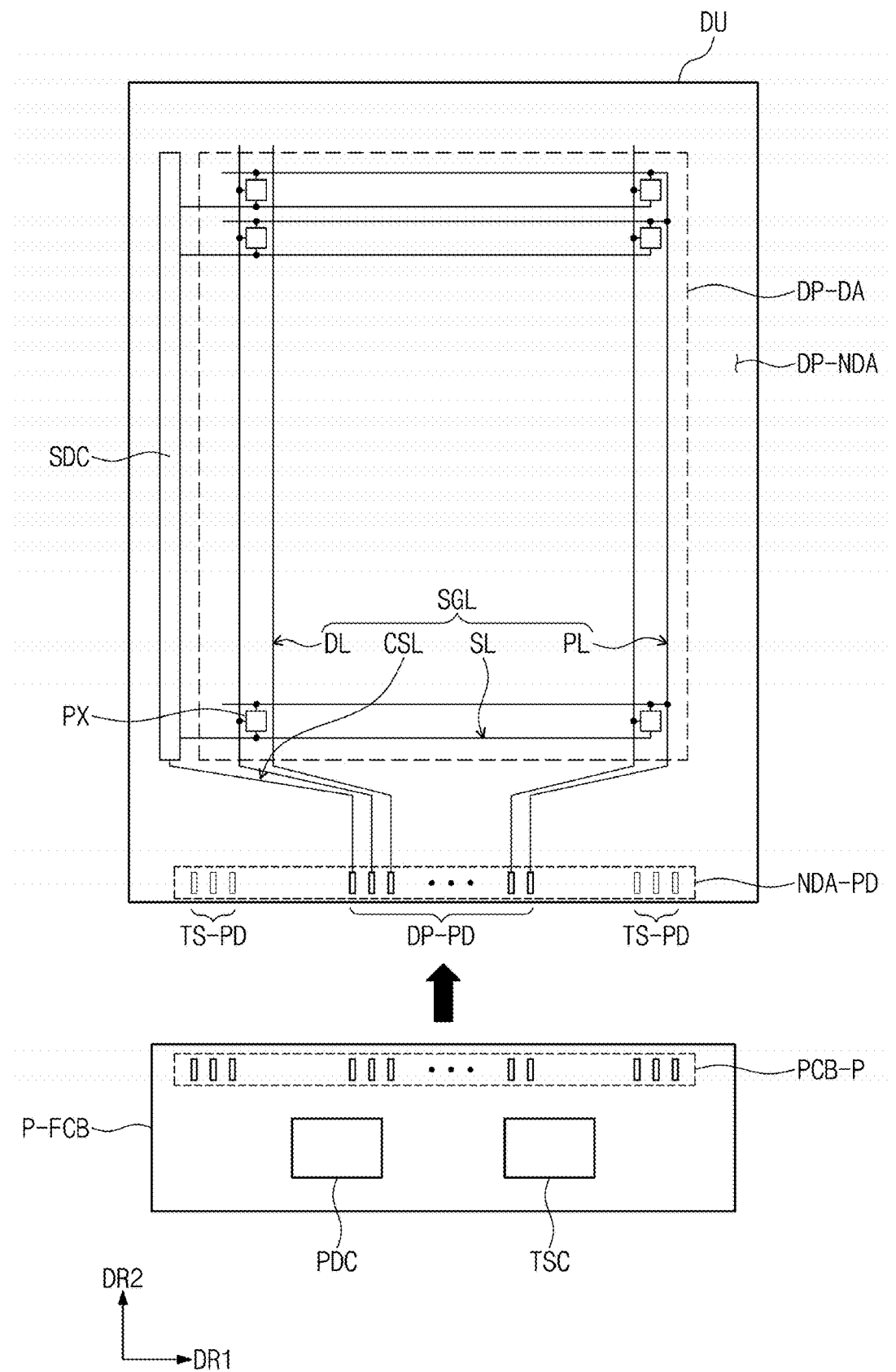
FIG. 3 is a plan view of an exemplary embodiment of a display unit constructed according to principles of the invention.

FIG. 3 is a plan view of an exemplary embodiment of a display unit constructed according to principles of the invention. FIG. 3 schematically shows a signal circuit diagram. In addition, for convenience of description, some components in FIG. 3 are omitted to avoid redundancy.

As shown in FIG. 3, the display unit DU includes a display area DP-DA and a non-display area DP-NDA in a plan view. In this embodiment, the non-display area DP-NDA may be defined along the outline of the display area DP-DA. The display area DP-DA and the non-display area DP-NDA of the display unit DU correspond to the display area DA and the non-display area NDA of the electronic device ED shown in FIG. 1A, respectively.

The display unit DU may include a scan driving circuit SDC, a plurality of signal lines SGL (hereinafter referred to as signal lines), a plurality of signal pads DP-PD (hereinafter referred to as signal pads), and a plurality of pixels PX (hereinafter referred to as pixels). The pixels PX are disposed in the display area DP-DA. Each of the pixels PX includes an organic light emitting diode and a pixel driving circuit connected thereto.

The scan driving circuit SDC generates a plurality of scan signals (hereinafter, referred to as scan signals), and sequentially outputs the scan signals to a plurality of scan lines SL (hereinafter referred to as scan lines) described later. The scan driving circuit SDC may further output another control signal to the driving circuit of the pixels PX.

The scan driving circuit SDC may include a plurality of thin film transistors formed through the same process as the driving circuit of the pixels PX, for example, a Low Temperature Polycrystalline Silicon (LTPS) process or a Low Temperature Polycrystalline Oxide (LTPO) process.

The signal lines SGL include scan lines SL, data lines DL, a power supply line PL, and a control signal line CSL. The scan lines SL are respectively connected to corresponding pixels PX among the pixels PX, and the data lines DL are respectively connected to corresponding pixels PX among the pixels PX. The power supply line PL is connected to pixels PX. The control signal line CSL may provide control signals to the scan driving circuit SDC.

The signal lines SGL overlap the display area DP-DA and the non-display area DP-NDA. The signal lines SGL may include a pad part and a line part. The line part overlaps the display area DP-DA and the non-display area DP-NDA. The pad part is connected to the end of the line part. The pad part is disposed in the non-display area DP-NDA and overlaps the corresponding signal pad among the signal pads DP-PD. The area where the signal pads DP-PD are disposed in the non-display area DP-NDA may be defined as the pad area NDA-PD.

A line part substantially connected to the pixel PX constitutes most of the signal lines SGL. The line part is connected to the transistors of the pixel PX. The line part may have a single layer/multilayer structure, and the line part may be a single body or may include two or more parts. The two or more parts may be disposed on different layers and may be connected to each other through a contact hole passing through the insulating layer disposed between the two or more parts.

The display unit DU may further include input sensing pads TS-PD disposed in the pad area NDA-PD. Since the input sensing pads TS-PD are formed through the same process as the signal lines SGL, they may be disposed on the same layer as the signal lines SGL.

The input sensing pads TS-PD may overlap the pad portions of the signal lines provided in the touch sensing unit TSU shown in FIG. 1C. The input sensing pads TS-PD may be electrically isolated from the signal lines SGL of the display unit DU.

FIG. 3 additionally shows a panel circuit board P-FCB electrically connected to the display unit DU. The panel circuit board P-FCB may be a rigid circuit board or a flexible circuit board. The panel circuit board P-FCB may be directly connected to the display unit DU, or may be connected to the display unit DU through another circuit board.

The panel circuit board P-FCB may be provided with a panel driving circuit PDC for controlling the operation of the display unit DU. Also, a touch sensing circuit TSC for controlling the touch sensing unit TSU may be disposed on the panel circuit board P-FCB. Each of the panel driving circuit PDC and the touch sensing circuit TSC may be mounted on the panel circuit board P-FCB in the form of an integrated chip. The panel circuit board P-FCB may include circuit board pads PCB-P electrically connected to the display unit DU. The panel circuit board P-FCB further includes signal lines connecting the circuit board pads PCB-P and the panel driving circuit PDC and/or the touch sensing circuit TSC.

Figure 4:
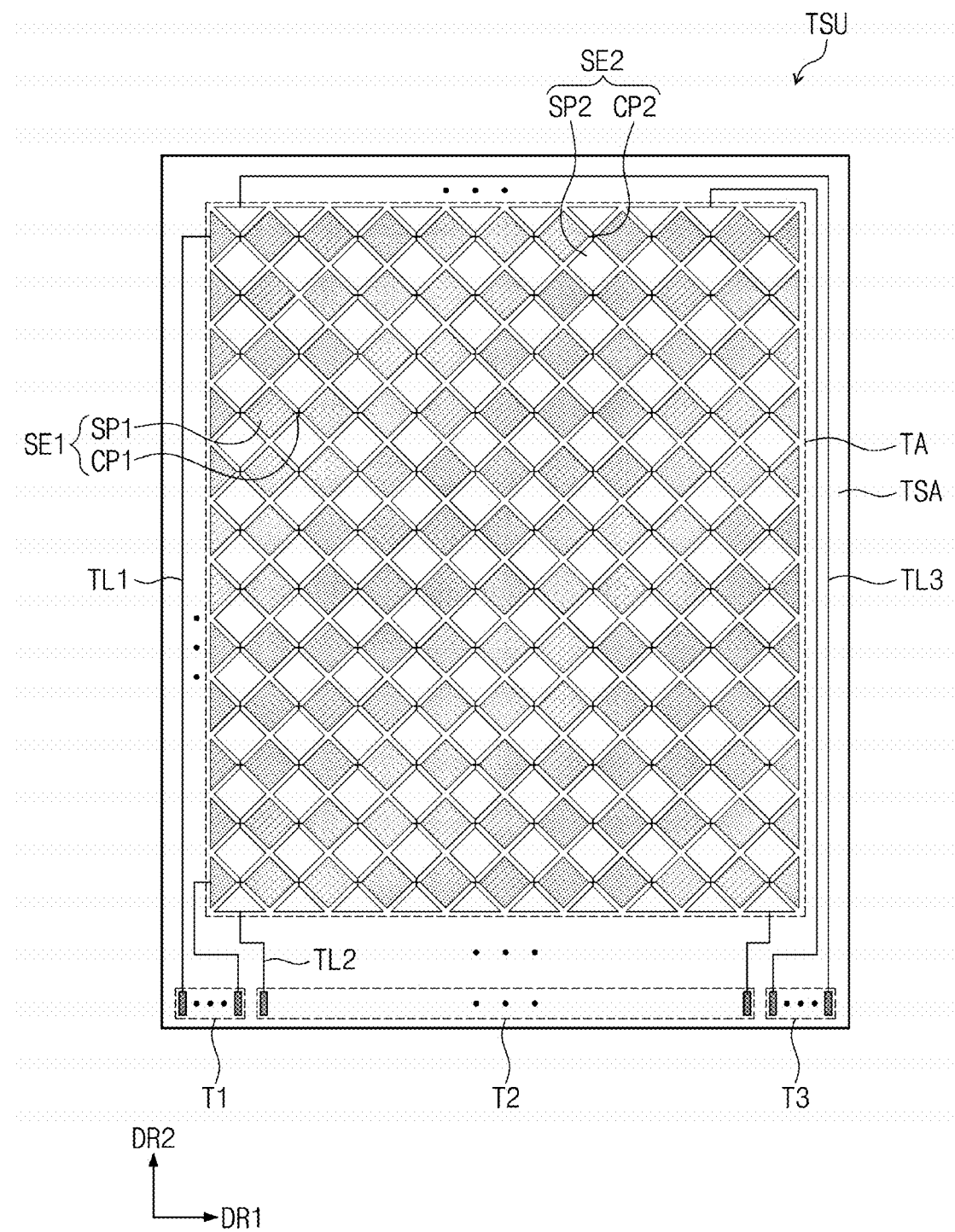
FIG. 4 is a plan view of an exemplary embodiment of a touch sensing unit constructed according to principles of the invention.

FIG. 4 is a plan view of an exemplary embodiment of a touch sensing unit constructed according to principles of the invention.

Referring to FIG. 4, the touch sensing unit TSU is disposed on the display unit DU. The touch sensing unit TSU senses the touch input TC (shown in FIG. 1A) to obtain the position or intensity information of the external touch input. The touch sensing unit TSU includes a touch area TA and a touch peripheral area TSA in a plan view. In this embodiment, the touch peripheral area TSA may be defined along the outline of the touch area TA. The touch area TA and the touch peripheral area TSA of the touch sensing unit TSU correspond to the display area DA and the non-display area NDA of the electronic device ED shown in FIG. 1A, respectively.

The touch sensing unit TSU includes a plurality of first sensing electrodes SE1, a plurality of second sensing electrodes SE2, a plurality of sensing lines TL1, TL2 and TL3, and a plurality of sensing pads.

The first sensing electrodes SE1 and the second sensing electrodes SE2 are disposed in the touch area TA. The touch sensing unit TSU may obtain information on the touch input TC through the change in capacitance between the first sensing electrodes SE1 and the second sensing electrodes SE2.

Each of the first sensing electrodes SE1 extends along the first direction DR1 and is arranged along the second direction DR2. The first sensing electrodes SE1 may include a plurality of first sensing patterns SP1 and a plurality of first connection patterns CP1.

The first sensing patterns SP1 constituting the first sensing electrode SE1 are spaced apart from each other along the first direction DR1. The first sensing patterns SP1 are shaded with respect to the second sensing patterns SP2 for easy explanation in this embodiment. The first connection patterns CP1 are disposed between the first sensing patterns SP1 and connect two adjacent first sensing patterns SP1.

Each of the second sensing electrodes SE2 extends along the second direction DR2 and is arranged along the first direction DR1. The second sensing electrodes SE2 may include a plurality of second sensing patterns SP2 and a plurality of second connection patterns CP2.

The second sensing patterns SP2 constituting the second sensing electrode SE2 are spaced apart from each other along the second direction DR2. The second connection patterns CP2 are disposed between the second sensing patterns SP2 and connect the two adjacent second sensing patterns SP2.

The sensing lines TL1, TL2 and TL3 are arranged in the touch peripheral area TSA. The sensing lines TL1, TL2 and TL3 may include first sensing lines TL1, second sensing lines TL2 and third sensing lines TL3. The first sensing lines TL1 are connected to the first sensing electrodes SE1, respectively. The second sensing lines TL2 are connected to one ends of the second sensing electrodes SE2, respectively.

The third sensing lines TL3 are connected to the other ends of the second sensing electrodes SE2, respectively. The other ends of the second sensing electrodes SE2 may be portions opposite to the one ends of the second sensing electrodes SE2. According to exemplary embodiments of the invention, the second sensing electrodes SE2 may be connected to the second sensing lines TL2 and the third sensing lines TL3. Accordingly, for the second sensing electrodes SE2 having a relatively longer length than the first sensing electrodes SE1, the sensitivity according to an area may be maintained uniformly. On the other hand, this is illustratively shown. The third sensing lines TL3 may be omitted and are not limited to any one embodiment.

The sensing pads, as depicted in FIG. 3, are disposed in the touch peripheral area TSA. The sensing pads may include first sensing pad T1, second sensing pad T2, and third sensing pad T3. The first sensing pad T1 is connected to the first sensing lines TL1 to provide an external signal to the first sensing electrode SE1. The second sensing pad T2 is electrically connected to the second sensing electrode SE2 through the second sensing line TL2. The third sensing pad T3 is electrically connected to the second sensing electrode SE2 through the third sensing line TL3.

Figure 5:
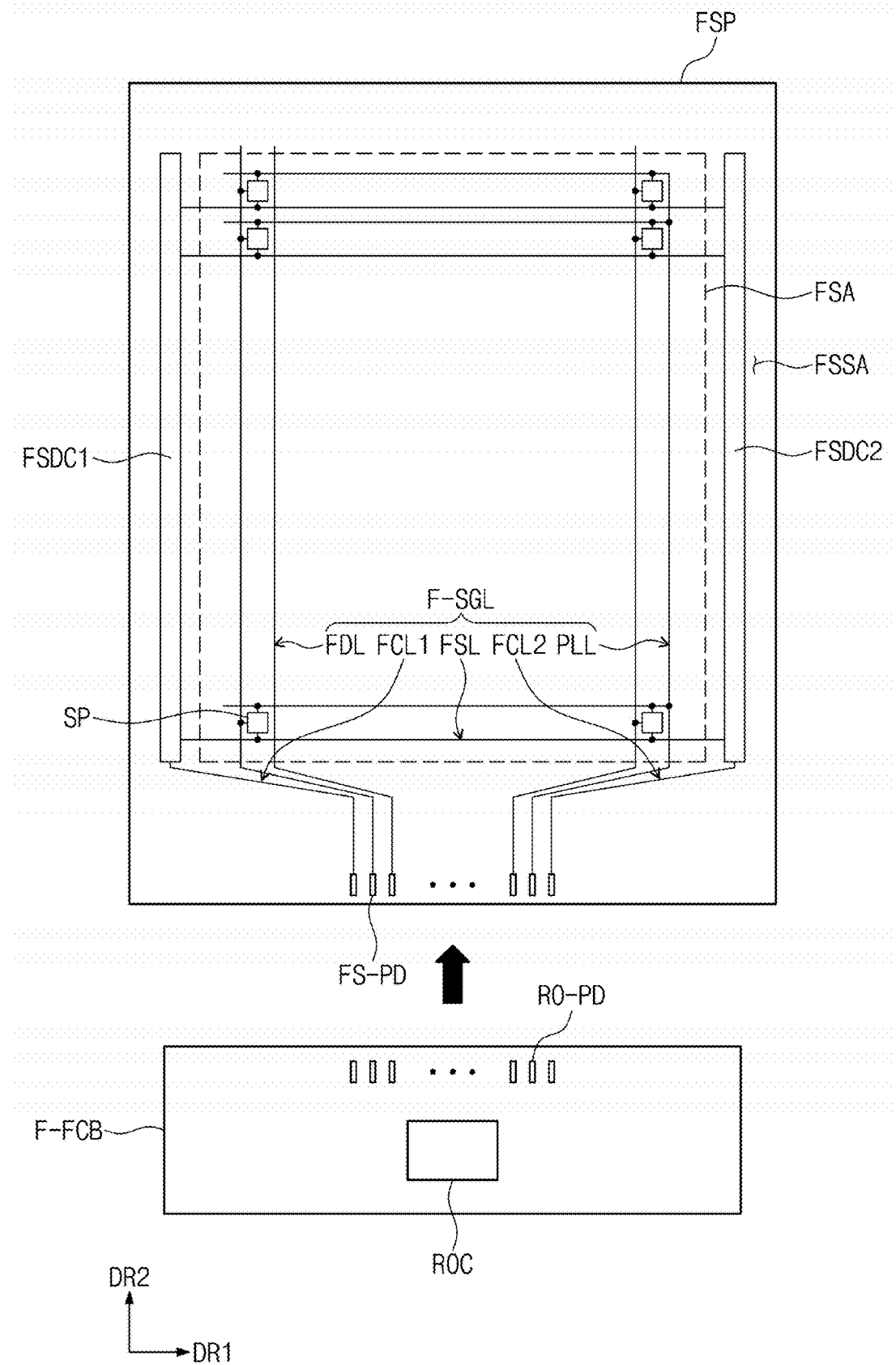
FIG. 5 is a plan view of an exemplary embodiment of a fingerprint sensing panel constructed according to principles of the invention.

FIG. 5 is a plan view of an exemplary embodiment of a fingerprint sensing panel constructed according to principles of the invention.

Referring to FIG. 5, a fingerprint sensing panel FSP may obtain user fingerprint information (fingerprint signal) by sensing the reflection light reflected by the touch input TC shown in FIG. 1A. The fingerprint sensing panel FSP includes a fingerprint sensing area FSA and a peripheral area FSSA in a plan view. In this embodiment, the peripheral area FSSA may be defined along the outline of the fingerprint sensing area FSA. The fingerprint sensing area FSA and the peripheral area FSSA of the fingerprint sensing panel FSP overlap in a plan view the display area DA and the non-display area NDA of the electronic device ED shown in FIG. 1A, respectively. Therefore, the display area DA of the electronic device ED shown in FIG. 1A, the display area DP-DA of the display unit DU shown in FIG. 3, the touch area TA of the touch sensing unit TSU shown in FIG. 4, and the fingerprint sensing area FSA of the fingerprint sensing panel FSP shown in FIG. 5 overlap each other in a plan view. Similarly, the non-display area NDA of the electronic device ED shown in FIG. 1A, the non-display area DP-NDA of the display unit DU shown in FIG. 3, the touch peripheral area TSA of the touch sensing unit TSU, and the peripheral area FSSA of the fingerprint sensing panel FSP overlap each other.

The fingerprint sensing panel FSP may include a first fingerprint scan driving circuit FSDC1, a second fingerprint scan driving circuit FSDC2, a plurality of fingerprint signal lines F-SGL (hereinafter referred to as fingerprint signal lines), a plurality of fingerprint signal pads FS-PD, and a plurality of fingerprint sensing pixels SP. The fingerprint sensing pixels SP are disposed in the fingerprint sensing area FSA.

The first fingerprint scan driving circuit FSDC1 generates a plurality of fingerprint scan signals and sequentially outputs the fingerprint scan signals to a plurality of fingerprint scan lines FSL described later. The first fingerprint scan driving circuit FSDC1 may further output another control signal to the fingerprint sensing pixels SP.

The second fingerprint scan driving circuit FSDC2 generates a plurality of fingerprint scan signals and sequentially outputs the fingerprint scan signals to a plurality of fingerprint scan lines FSL described later. The second fingerprint scan driving circuit FSDC2 may further output another control signal to the fingerprint sensing pixels SP.

In this exemplary embodiment, each of the fingerprint scan lines FSL is commonly connected to the first fingerprint scan driving circuit FSDC1 and the second fingerprint scan driving circuit FSDC2. In another embodiment, the fingerprint sensing panel FSP may include only one of the first fingerprint scan driving circuit FSDC1 and the second fingerprint scan driving circuit FSDC2.

Figure 7:
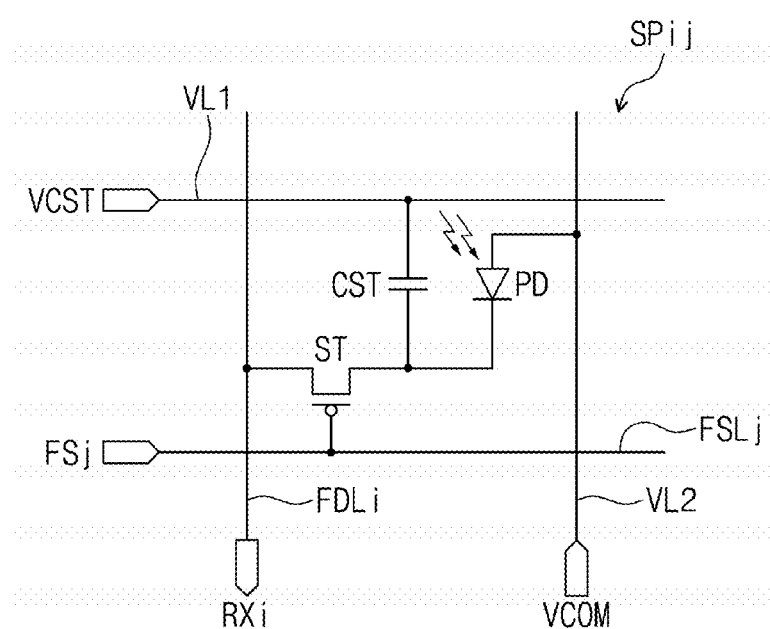
FIG. 7 is a circuit diagram illustrating an exemplary embodiment of a representative pixel connected to the i-th fingerprint sensing line and the j-th fingerprint scan line constructed according to principles of the invention.

The fingerprint signal lines F-SGL include fingerprint scan lines FSL, fingerprint sensing lines FDL, a power supply line PLL, a first control signal line FCL1, and a second control signal line FCL2. The fingerprint scan lines FSL are connected to the corresponding fingerprint sensing pixels SP among the fingerprint sensing pixels SP, respectively, and the fingerprint sensing lines FDL are connected to the corresponding fingerprint sensing pixels SP among the fingerprint sensing pixels SP, respectively. The power supply line PLL is connected to the fingerprint sensing pixels SP. In FIG. 5, the power supply line PLL is one, but each fingerprint sensing pixel SP may be connected to two or more power supply lines PLL. In FIG. 7 described later, at least one of the first voltage VCST and the second voltage VCOM may be provided to the fingerprint sensing pixels SP through the power supply line PLL.

The first control signal line FCL1 may provide control signals to the first fingerprint scan driving circuit FSDC1. The second control signal line FCL2 may provide control signals to the second fingerprint scan driving circuit FSDC2.

The fingerprint signal lines F-SGL overlap the fingerprint sensing area FSA and the peripheral area FSSA. The fingerprint signal lines F-SGL may include a pad part and a line part. The line part overlaps the fingerprint sensing area FSA and the peripheral area FSSA. The pad part is connected to the end of the line part. The pad part is disposed in the peripheral area FSSA and overlaps the corresponding fingerprint signal pad of the fingerprint signal pads FS-PD.

FIG. 5 additionally shows a fingerprint circuit board F-FCB electrically connected to a fingerprint sensing panel FSP. The fingerprint circuit board F-FCB may be a rigid circuit board or a flexible circuit board. The fingerprint circuit board F-FCB may be coupled directly to a fingerprint sensing panel FSP or to the fingerprint sensing panel FSP through another circuit board.

A read-out circuit ROC for controlling the operation of the fingerprint sensing panel FSP may be disposed on the fingerprint circuit board F-FCB. The read-out circuit ROC may be mounted on the fingerprint circuit board F-FCB in the form of an integrated chip. In one exemplary embodiment of the invention, the fingerprint circuit board F-FCB may include read-out pads RO-PD electrically connected to the fingerprint sensing panel FSP. The fingerprint circuit board F-FCB may further include signal lines connecting the read-out pads RO-PD and the read-out circuit ROC.

In an exemplary embodiment, the first fingerprint scan driving circuit FSDC1 and the second fingerprint scan driving circuit FSDC2 may be formed on the same substrate as the plurality of fingerprint sensing pixels SP, but the exemplary embodiments are not limited thereto. For example, the first fingerprint scan driving circuit FSDC1 and the second fingerprint scan driving circuit FSDC2 are each implemented as an independent integrated circuit chip and thus may be electrically connected to at least one side of the fingerprint sensing panel FSP. In yet another embodiment, the first fingerprint scan driving circuit FSDC1 and the second fingerprint scan driving circuit FSDC2 may be configured within the read-out circuit ROC, and may provide fingerprint scan signals to a plurality of fingerprint scan lines FSL through connection wirings.

Figure 6:
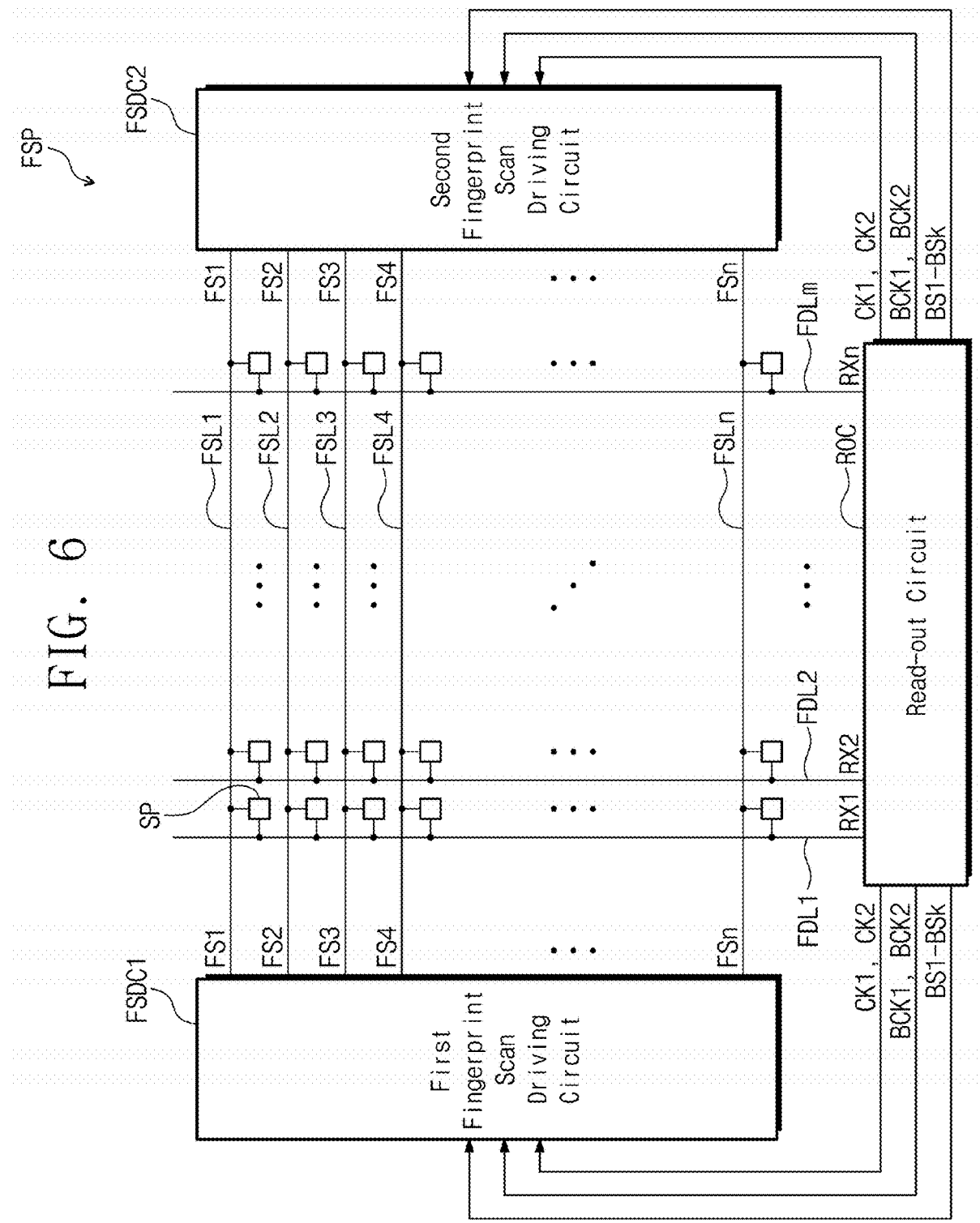
FIG. 6 is a block diagram of an exemplary embodiment depicting a connection relationship between fingerprint sensing pixels and a fingerprint sensing scan circuit and a read-out circuit constructed according to principles of the invention.

FIG. 6 is a block diagram of an exemplary embodiment depicting a connection relationship between fingerprint sensing pixels and a fingerprint sensing scan circuit and a read-out circuit constructed according to principles of the invention. FIG. 7 is a circuit diagram illustrating an exemplary embodiment of a representative fingerprint sensing pixel connected to the i-th fingerprint sensing line and the j-th fingerprint scan line constructed according to principles of the invention.

Referring to FIGS. 6 and 7, each of the fingerprint sensing pixels SP is connected to a corresponding one of the plurality of fingerprint sensing lines FDL1 to FDLm, and is connected to a corresponding one of the plurality of fingerprint scan lines FSL1 to FSLn.

For example, as shown in FIG. 7, the fingerprint sensing pixel SPij may be connected to the i-th fingerprint sensing line FDLi and the j-th fingerprint scan line FSLj.

Figure 8:
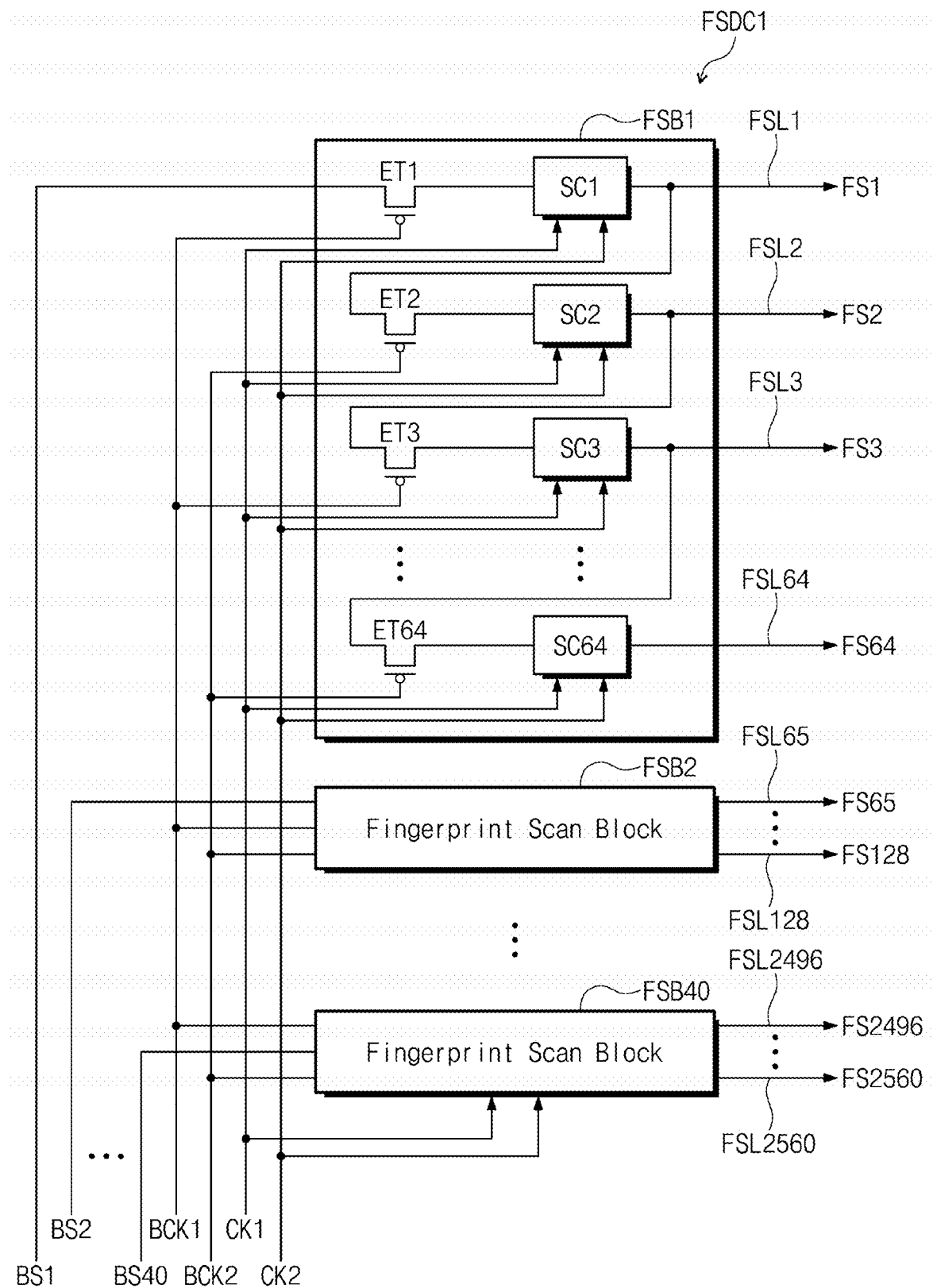
FIG. 8 is a block diagram illustrating an exemplary embodiment of a circuit configuration of the first fingerprint scan driving circuit shown in FIG. 6.

The first fingerprint scan driving circuit FSDC1 outputs fingerprint scan signals FS1 to FSn to the plurality of fingerprint scan lines FSL1 to FSLn in response to the block selection signals BS1 to BSk where "n" and "k" as depicted for the exemplary embodiment in FIG. 8 is, respectively 2560 and 40, the first and second block clock signals BCK1 and BCK2, and the first and second clock signals CK1 and CK2. The second fingerprint scan driving circuit FSDC2 outputs fingerprint scan signals FS1 to FSn to the plurality of fingerprint scan lines FSL1 to FSLn in response to the block selection signals BS1 to BSk, the first and second block clock signals BCK1 and BCK2, and the first and second clock signals CK1 and CK2. The first fingerprint scan driving circuit FSDC1 and the second fingerprint scan driving circuit FSDC2 may have substantially the same circuit configuration. The block selection signals BS1 to BSk, the first and second block clock signals BCK1 and BCK2, and the first and second clock signals CK1 and CK2 are provided from the read-out circuit ROC.

The read-out circuit ROC receives fingerprint sensing signals RX1 to RXm from a plurality of fingerprint sensing lines FDL1 to FDLm.

In an exemplary embodiment, the read-out circuit ROC provides the block selection signals BS1 to BSk for driving fingerprint scan lines included in a predetermined one among a plurality of fingerprint scan lines FSL1 to FSLn, the first and second block clock signals BCK1 and BCK2, and the first and second clock signals CK1 and CK2, to the first fingerprint scan driving circuit FSDC1 and the second fingerprint scan driving circuit FSDC2. The read-out circuit ROC may also receive a fingerprint sensing signal from fingerprint sensing lines included in a predetermined sensing area among the plurality of fingerprint sensing lines FDL1 to FDLm.

Referring to FIG. 7, a fingerprint sensing pixel SPij includes a switching transistor ST, a capacitor CST, and a photodiode PD. The switching transistor ST includes a first electrode connected to the i-th fingerprint sensing line FDLi, a second electrode connected to one end of the capacitor CST, and a gate electrode connected to the j-th fingerprint scan line FSLj. One end of the capacitor CST is connected to the second electrode of the switching transistor ST and the other end is connected to the first voltage line VL1 to which the first voltage VCST is supplied. The photodiode PD includes an anode connected to the second voltage line VL2 to which the second voltage VCOM is supplied, and a cathode connected to the second electrode of the switching transistor ST.

In relation to the photodiode PD, current flows when light is received, and the magnitude of the voltage is almost proportional to the amount of light. The charge generated by the photodiode PD may be stored in the capacitor CST. When a low-level fingerprint scan signal FSj is received through the j-th fingerprint scan line FSLj, the switching transistor ST is turned on and as the charge stored in the capacitor CST is discharged, the fingerprint sensing signal RXi is outputted through the i-th fingerprint sensing line FDLi.

The fingerprint sensing pixel SPij shown in FIG. 7 is an exemplary embodiment, and the exemplary embodiments are not limited thereto. In another embodiment, the fingerprint sensing pixel SPij may include two or more switching transistors ST.

FIG. 8 is a view illustrating an exemplary embodiment of a circuit configuration of the first fingerprint scan driving circuit shown in FIG. 6. Although only the first fingerprint scan driving circuit FSDC1 is shown and described with reference to FIG. 8, the second fingerprint scan driving circuit FSDC2 may have the same circuit configuration as the first fingerprint scan driving circuit FSDC1.

In an exemplary embodiment, the fingerprint sensing panel FSP as shown in FIG. 6 includes 1280 fingerprint sensing pixels SP in a first direction DR1 and 2560 fingerprint sensing pixels SP in a second direction DR2. Thus, the fingerprint sensing panel FSP may include 1280 fingerprint sensing lines FDL1 to FDL1280 and 2560 fingerprint scan lines FSL1 to FSL2560. The number of fingerprint sensing pixels SP, the number of fingerprint sensing lines and the number of fingerprint scan lines are only illustrative examples for convenience of explanation, and the exemplary embodiments are not limited thereto. Also, in this exemplary embodiment, the number of fingerprint sensing pixels SP arranged in the first direction DR1 is less than the number of fingerprint sensing pixels SP arranged in the second direction DR2, but the exemplary embodiments are not limited thereto. In another embodiment, the number of fingerprint sensing pixels SP arranged in the first direction DR1 is equal to or greater than the number of fingerprint sensing pixels SP arranged in the second direction DR2.

The first fingerprint scan driving circuit FSDC1 shown in FIG. 8 includes 40 fingerprint scan blocks FSB1 to FSB40. Each of the fingerprint scan blocks FSB1 to FSB40 corresponds to 64 fingerprint scan lines. For example, the fingerprint scan block FSB1 may sequentially drive the fingerprint scan lines FSL1 to FSL64.

The fingerprint scan blocks FSB1 to FSB40 operate in response to the corresponding block selection signal among the block selection signals BS1 to BS40. Each of the fingerprint scan blocks FSB1 to FSB40 receives the first and second block clock signals BCK1 and BCK2 and the first and second clock signals CK1 and CK2. The block selection signals BS1 to BS40, the first and second block clock signals BCK1 and BCK2 and the first and second clock signals CK1 and CK2 are provided from the read-out circuit ROC.

Since the fingerprint scan blocks FSB1 to FSB40 operate similarly with the same circuit configuration, only the fingerprint scan block FSB1 will be specifically shown and described.

The fingerprint scan block FSB1 includes transistors ET1 to ET64 and stages SC1 to SC64 respectively corresponding to the fingerprint scan lines FSL1 to FSL64. The representative transistor ET1 in the fingerprint scan block FSB1 includes a first electrode for receiving a block selection signal BS1, a second electrode connected to the representative stage SC1, and a gate electrode for receiving a first block clock signal BCK1. The first electrode of each of the transistors ET2 to ET64 in the fingerprint scan block FSB1 is connected to the output line of the previous stage, that is, the previous fingerprint scan line. The second electrode of each of the transistors ET2 to ET64 in the fingerprint scan block FSB1 is connected to a corresponding one among the stages SC2 to SC64. The even-numbered transistors ET2, ET4, . . . and ET64 among the transistors ET2 to ET64 receive the second block clock signal BCK2, and the odd-numbered transistors ET1, ET3, . . . and ET63 receive the first block clock signal BCK1.

The stage SC1 outputs the representative fingerprint scan signal FS1 to the corresponding representative fingerprint scan line FSL1 in response to the block selection signal BS1 received through the transistor ET1 and the first and second clock signals CK1 and CK2.

Each of the stages SC2 to SC64 outputs the fingerprint scan signals FS2 to FS64 to the corresponding fingerprint scan lines FSL2 to FSL64 in response to the previous fingerprint scan signal received through the corresponding transistors ET2 to ET64 and the first and second clock signals CK1 and CK2.

Figure 9:
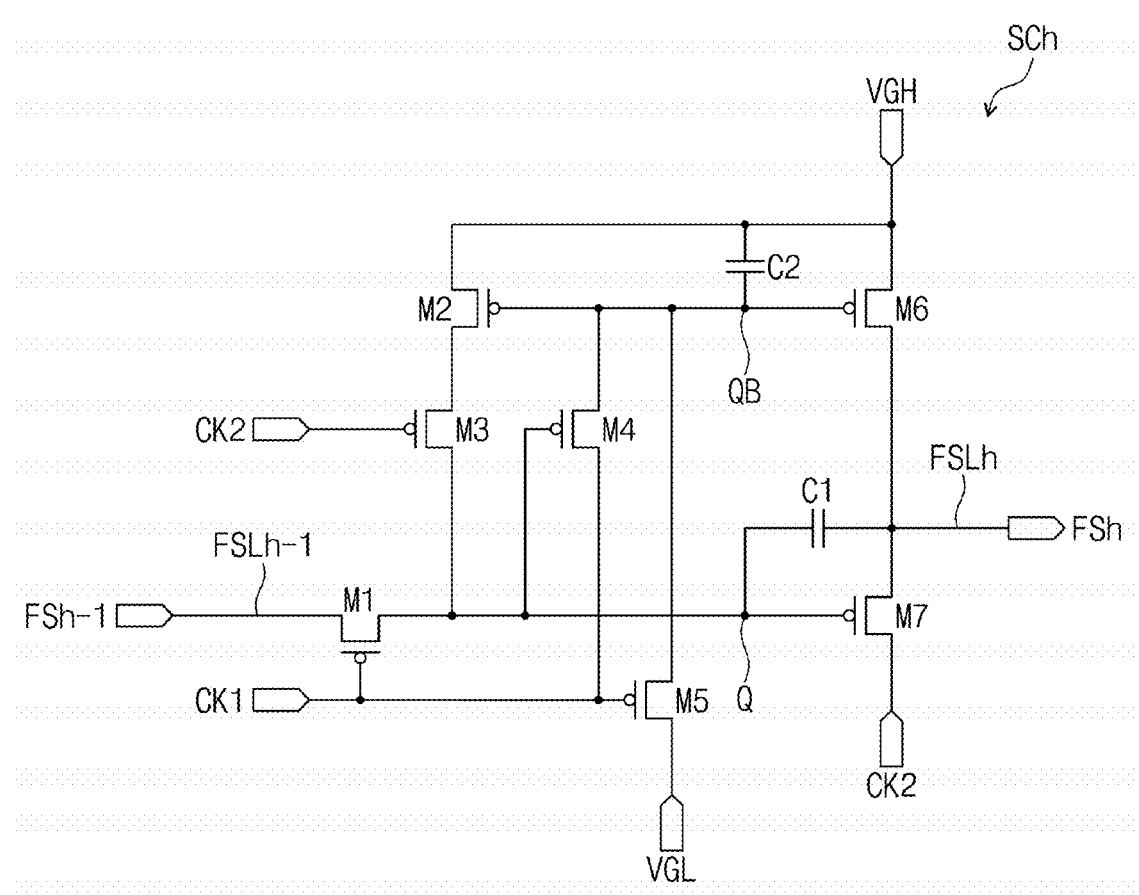
FIG. 9 is an exemplary embodiment of a circuit diagram illustrating the stage shown in FIG. 8.

FIG. 9 is an exemplary embodiment of a circuit diagram illustrating the stage shown in FIG. 8.

Referring to FIG. 9, the stage SCh corresponding to the h-th fingerprint scan line FSLh receives the (h−1)-th fingerprint scan signal FSh−1 from the (h−1)-th fingerprint scan line FSLh−1, the first clock signal CK1, the second clock signal CK2, a high voltage VGH, and a low voltage VGL, and outputs the h-th fingerprint scan signal FSh to the h-th fingerprint scan line FSLh. In an exemplary embodiment, the high voltage VGH may be a voltage with a higher level than the low voltage VGL.

The stage SCh includes first to seventh transistors M1 to M7, a first capacitor C1, and a second capacitor C2.

The first transistor M1 includes a first electrode for receiving the (h−1)-th fingerprint scan signal FSh−1, a second electrode connected to the first node Q and a gate electrode for receiving the first clock signal CK1.

The second transistor M2 includes a first electrode receiving the high voltage VGH, a second electrode, and a gate electrode connected to the second node QB.

The third transistor M3 includes a first electrode connected to the second electrode of the second transistor M2, a second electrode connected to the first node Q and a gate electrode receiving the second clock signal CK2.

The fourth transistor M4 includes a first electrode connected to the second node QB, a second electrode receiving the first clock signal CK1, and a gate electrode connected to the first node Q.

The sixth transistor M6 includes a first electrode for receiving the high voltage VGH, a second electrode connected to the h-th fingerprint scan line FSLh, and a gate electrode connected to the second node QB.

The seventh transistor M7 includes a first electrode connected to the h-th fingerprint scan line FSLh, a second electrode receiving the second clock signal CK2, and a gate electrode connected to the first node Q.

The first capacitor C1 is connected between the first node Q and the h-th fingerprint scan line FSLh. The second capacitor C2 is connected between the signal line receiving the high voltage VGH and the second node QB.

In this exemplary embodiment, each of the first to seventh transistors M1 to M7 is a PMOS transistor, but the exemplary embodiments are not limited thereto. In addition, the circuit configuration of the stage SCh is not limited to the circuit shown in FIG. 9.

Figure 10:
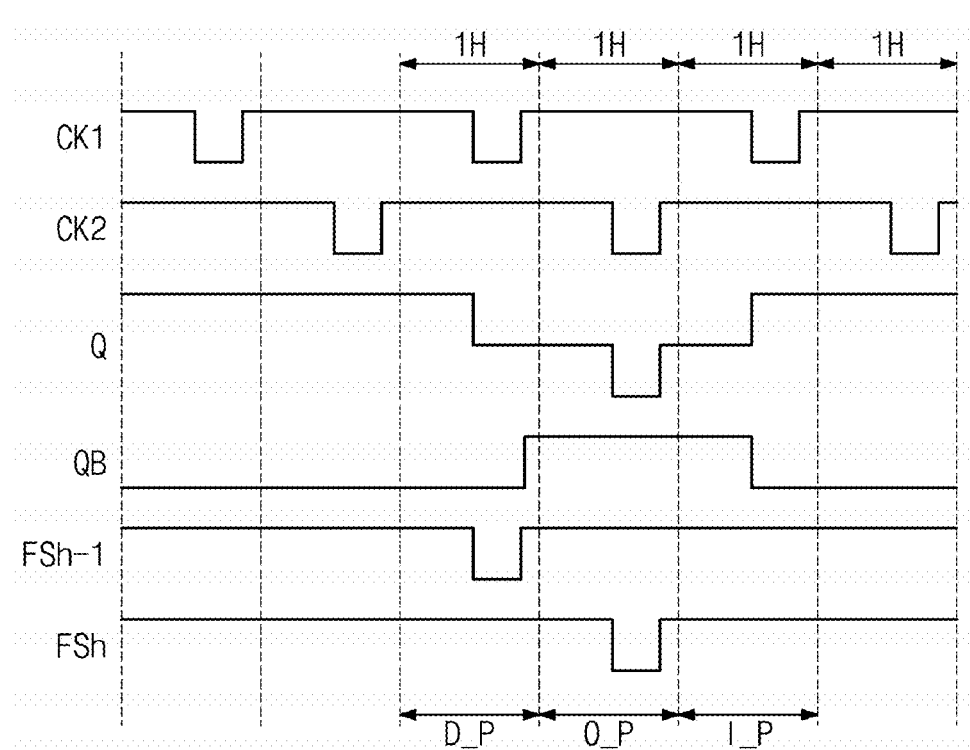
FIG. 10 is an exemplary embodiment of a timing diagram for explaining the operation of the stage shown in FIG. 9.

FIG. 10 is an exemplary embodiment of a timing diagram for explaining the operation of the stage shown in FIG. 9.

Referring to FIGS. 9 and 10, when the first transistor M1 is turned on in response to the low-level first clock signal CK1 in the sensing section D_P, the (h−1)-th fingerprint scan signal FSh−1 of the low level is transferred to the first node Q. If each of the first node Q and the first clock signal CK1 is at a low level, the fourth transistor M4 and the fifth transistor M5 are respectively turned on so that the second node QB is maintained at the low level of the first clock signal CK1.

In the output section O_P, when the first clock signal CK1 transits to the high level, the first transistor M1 and the fifth transistor M5 are turned off, and the second node QB transits to the high level. As the second node QB transits to the high level, the sixth transistor M6 is turned off. When the second clock signal CK2 transits to the low level, the h-th fingerprint scan signal FSh is maintained at a low level by a low level pulse width of the second clock signal CK2.

In the initialization section I_P, when the first clock signal CK1 transits to the low level again, the first transistor M1 is turned on and the (h−1)-th fingerprint scan signal FSh−1 of a high level is transferred to the first node Q. Therefore, the seventh transistor M7 is turned off. As the fifth transistor M5 is turned on, the second node QB transits to the low level. Therefore, the sixth transistor M6 is turned on and the h-th fingerprint scan signal FSh may be initialized to a high level.

In FIG. 10, the first horizontal scan section 1H means a section in which each of the fingerprint scan lines FSL1 to FSLm shown in FIG. 6 is driven.

Referring to FIG. 8 again, for example, if the block selection signal BS1 is in a low level, the fingerprint scan block FSB1 may output the fingerprint scan signals FS1 to FS64 to the corresponding fingerprint scan lines FSL1 to FSL64 in response to the first and second block clock signals BCK1 and BCK2 and the first and second clock signals CK1 and CK2. For example, the fingerprint scan signals FS1 to FS64 are sequentially enabled to a low level during the first horizontal scan section 1H.

For example, if the block selection signal BS2 is in a low level, the fingerprint scan block FSB2 may output the fingerprint scan signals FS65 to FS128 to the corresponding fingerprint scan lines FSL65 to FSL128 in response to the first and second block clock signals BCK1 and BCK2 and the first and second clock signals CK1 and CK2.

For example, if the block selection signal BS40 is in a low level, the fingerprint scan block FSB40 may output the fingerprint scan signals FS2496 to FS2560 to the corresponding fingerprint scan lines FSL2496 to FSL2560 in response to the first and second block clock signals BCK1 and BCK2 and the first and second clock signals CK1 and CK2.

In relation to the block selection signals BS1 to BS40, depending on the sensing area described above, two or more block selection signals may be activated simultaneously at a low level. For example, adjacent four block selection signals among the block selection signals BS1 to BS40 may be activated simultaneously at a low level.

Figure 11:
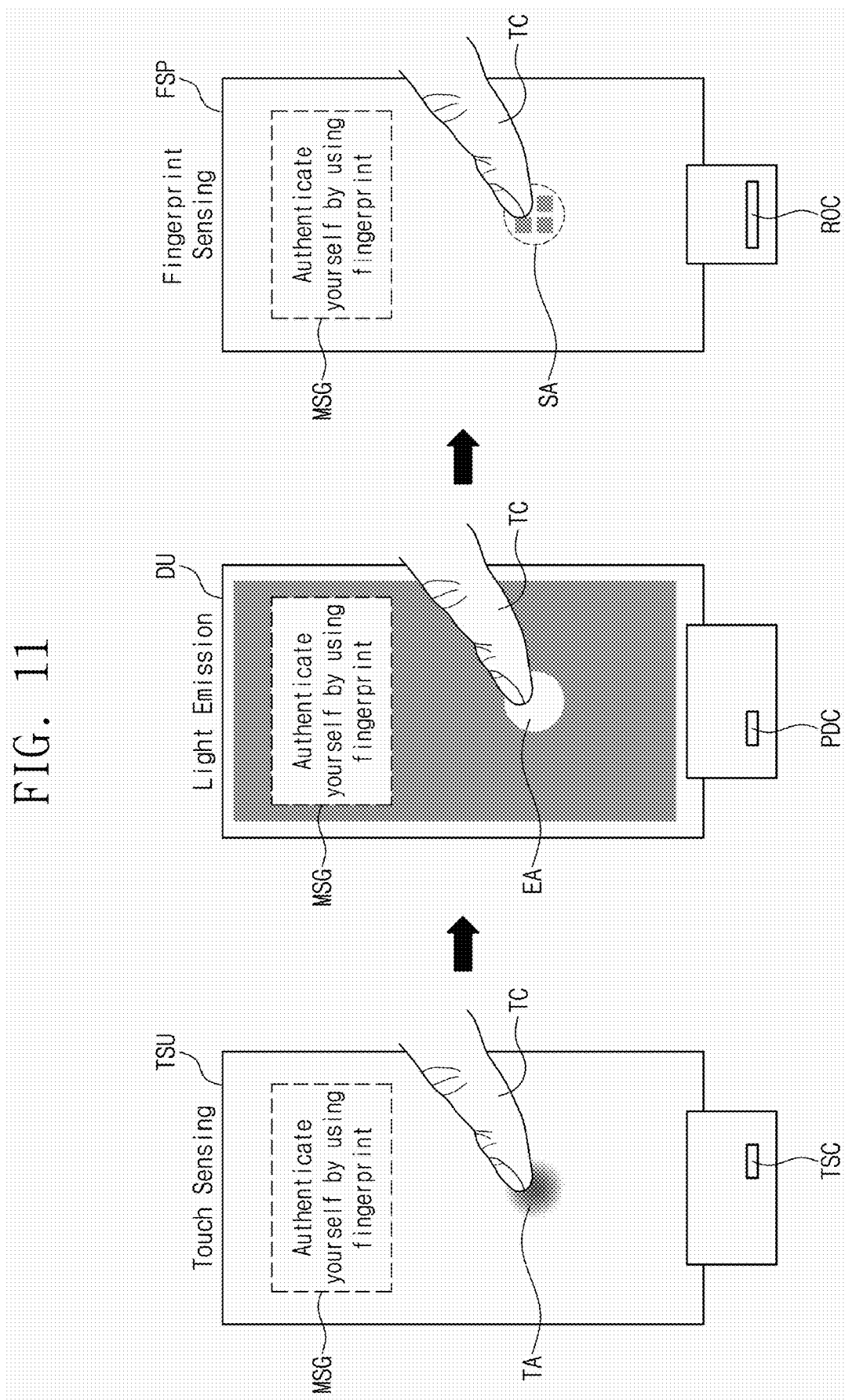
FIG. 11 is a schematic view of an exemplary embodiments of a touch sensing unit, display unit and fingerprint sensing panel illustrating an exemplary operation of an electronic device constructed according to principles of the invention.

FIG. 11 is a schematic view of exemplary embodiments of a touch sensing unit, display unit and fingerprint sensing panel illustrating an exemplary operation of an electronic device constructed according to principles of the invention.

For convenience of explanation, the touch sensing unit TSU, the display unit DU and the fingerprint sensing panel FSP of the electronic device ED are separated and shown in FIG. 11.

Referring to FIGS. 2 and 11, when a message MSG indicating "authenticate yourself by using a fingerprint" is displayed at a predetermined position of the electronic device ED, the user will touch a pre-registered finger to the electronic device ED. The type and form of the message MSG displayed on the electronic device ED may vary. Also, the touch sensing process may be performed without a special message MSG. For example, the electronic device ED may sense the touch input TC and perform the functions of user authentication and unlocking even when the display unit DU is turned off for power saving.

The touch sensing unit TSU senses the touch input TC and provides position information of the touch input TC to the touch sensing circuit TSC. The touch sensing circuit TSC transfers the position information from the touch sensing unit TSU to the control module CM shown in FIG. 2.

The control module CM sets the touch area TA based on the position information from the touch sensing unit TSU and selects the light emitting area EA corresponding to the touch area TA. The control module CM controls the panel driving circuit PDC such that the brightness of the light emitting area EA of the display unit DU increases. The panel driving circuit PDC displays a message MSG in a predetermined area of the display unit DU and increases the brightness of the light emitting area EA.

For example, the control module CM may control the panel driving circuit PDC so that the brightness of the image displayed in the light emitting area EA is raised by a predetermined level or is the brightness of an arbitrary first level.

Continuously, the control module CM provides a read-out circuit ROC with a signal for selecting the sensing area SA of the fingerprint sensing panel FSP corresponding to the touch area TA. The read-out circuit ROC receives fingerprint information according to the touch input TC from the sensing area SA of the fingerprint sensing panel FSP.

Figure 12:
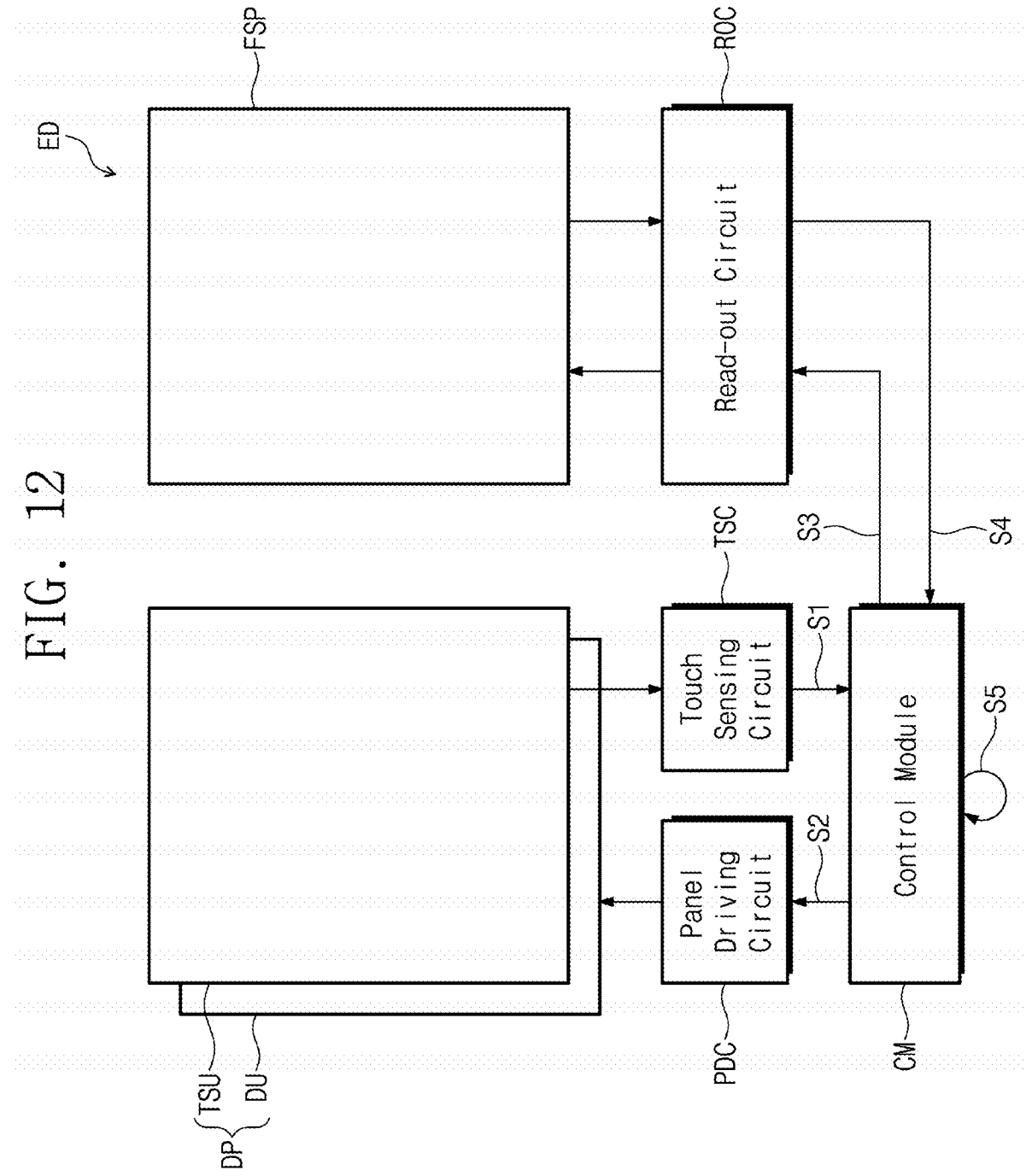
FIGS. 12 and 13 are block and timing diagrams, respectively, of an exemplary embodiment illustrating an exemplary operation of a control module of an electronic device constructed according to principles of the invention.
Figure 13:
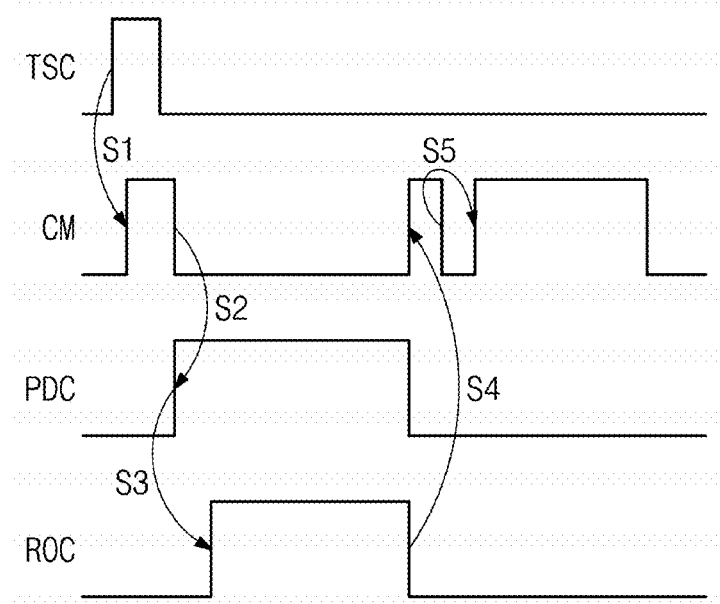

FIGS. 12 and 13 are block and timing diagrams, respectively, of an exemplary embodiment illustrating an exemplary operation of a control module of an electronic device constructed according to principles of the invention.

Referring to FIGS. 12 and 13, when the touch input TC of the user shown in FIG. 1A is sensed by the touch sensing unit TSU, the control module CM of the electronic device ED receives the touch sensing signal from the touch sensing circuit TSC (S1). The control module CM outputs a control signal for controlling the brightness of the light emitting area EA of the display unit DU to the panel driving circuit PDC in response to the touch sensing signal from the touch sensing circuit TSC (S2).

On the other hand, the control module CM outputs a control signal for selecting a sensing area SA of the fingerprint sensing panel FSP to the read-out circuit ROC (S3). The read-out circuit ROC outputs selection signals for selecting the sensing area SA of the fingerprint sensing panel FSP to the fingerprint sensing panel FSP in response to a control signal from the control module CM. The read-out circuit ROC provides a fingerprint sensing signal from the sensing area SA of the fingerprint sensing panel FSP to the control module CM (S4).

The control module CM performs an authentication process for comparing the fingerprint sensing signal from the read-out circuit ROC with the fingerprint signal stored in the memory MM shown in FIG. 2 (S5).

Figure 14A:
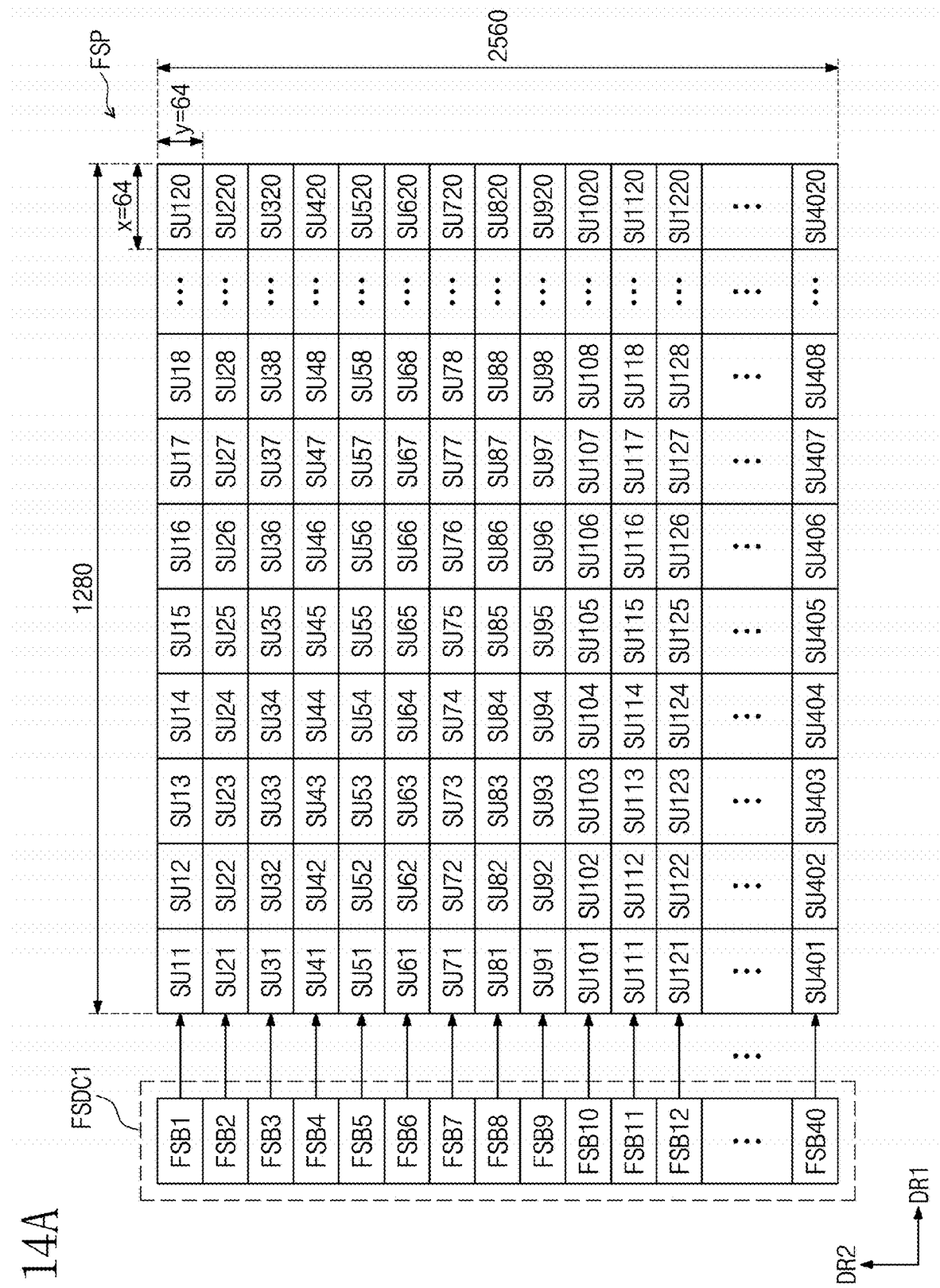
FIG. 14A is a block diagram illustrating an exemplary embodiment of a first fingerprint scan driving circuit for driving fingerprint scan lines of a fingerprint sensing panel constructed according to principles of the invention.

FIG. 14A is a block diagram illustrating an exemplary embodiment of a first fingerprint scan driving circuit for driving fingerprint scan lines of a fingerprint sensing panel constructed according to principles of the invention.

Referring to FIG. 14A, in an exemplary embodiment, the fingerprint sensing panel FSP includes 1280 fingerprint sensing pixels SP (see FIG. 5) in the first direction DR1 and 2560 fingerprint sensing pixels SP in the second direction DR2. In an exemplary embodiment, the fingerprint sensing panel FSP may include 20 columns of sensing units in the first direction DR1 and 40 rows of sensing units in the second direction DR2. Each of the sensing units may include x fingerprint sensing pixels SP (shown in FIG. 5) in the first direction DR1, and y fingerprint sensing pixels SP in the second direction DR2. Herein, x and y are positive integers, and in this exemplary embodiment, x=64, y=64.

The number of fingerprint sensing pixels SP and sensing units SU11 to SU4020 of the fingerprint sensing panel shown in FIG. 14A and the number of fingerprint sensing pixels SP in the sensing units SU11 to SU4020 are only examples for convenience of explanation, and the exemplary embodiments are not limited thereto. Also, in relation to the fingerprint sensing panel FSP shown in FIG. 14A, the number of fingerprint sensing pixels SP arranged in the second direction DR2 is larger than that in the first direction DR1, but the exemplary embodiments are not limited thereto.

Although FIG. 14A shows that the fingerprint sensing panel FSP includes only the first fingerprint scan driving circuit FSDC1, the fingerprint sensing panel FSP may further include a second fingerprint scan driving circuit FSDC2 shown in FIG. 5.

The number of the fingerprint scan blocks FSB1 to FSB40 in the first fingerprint scan driving circuit FSDC1 may be equal to the number of the sensing units arranged in the second direction DR2. The fingerprint scan blocks FSB1 to FSB40 drive corresponding fingerprint scan lines, respectively. For example, the fingerprint scan block FSB1 may drive the fingerprint scan lines connected to the sensing units SU11 to SU120 sequentially arranged in the first direction DR1, and the fingerprint scan block FSB2 may drive the fingerprint scan lines connected to the sensing units SU21 to SU220 sequentially arranged in the first direction DR1.

Figure 14B:
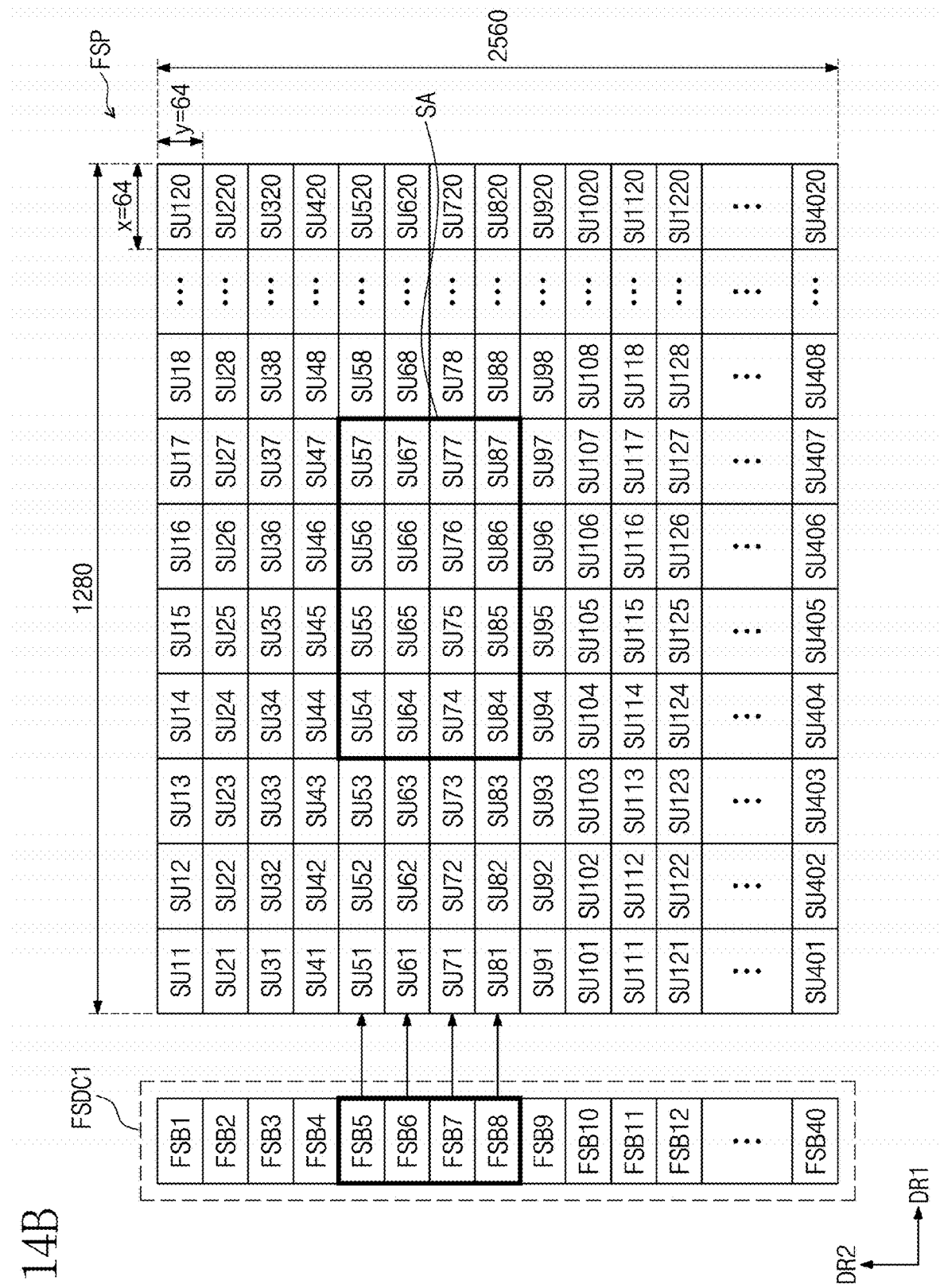
FIG. 14B is a block diagram illustrating an exemplary embodiment of a first fingerprint scan driving circuit for driving fingerprint scan lines in a sensing area of a fingerprint sensing panel constructed according to principles of the invention.

FIG. 14B is a block diagram illustrating an exemplary embodiment of a first fingerprint scan driving circuit for driving fingerprint scan lines in a sensing area of a fingerprint sensing panel constructed according to principles of the invention.

In an exemplary embodiment, the sensing area SA may include four columns of sensing units in a first direction DR1 and four rows of sensing units in a second direction DR2, i.e., a total of sixteen sensing units. That is, the control module CM shown in FIG. 12 outputs a control signal to the read-out circuit ROC so that when a predetermined area of the touch sensing unit TSU is touched, 16 sensing units corresponding to the touch area are selected as the sensing area SA. FIG. 14B illustratively shows that 16 sensing units SU54 to SU87 are selected as the sensing area SA.

The fingerprint scan blocks FSB5 to FSB8 in the first fingerprint scan driving circuit FSDC1 may sequentially drive the fingerprint scan lines corresponding to the sensing units SU54 to SU87 in response to the block selection signals BS5 to BS8 activated at the low level.

In this embodiment, since only the fingerprint scan blocks FSB5 to FSB8 operate, which correspond to the sensing units SU54 to SU87 in the sensing area SA among the fingerprint scan blocks FSB1 to FSB40 in the first fingerprint scan driving circuit FSDC1, power consumption may be reduced.

Figure 15:
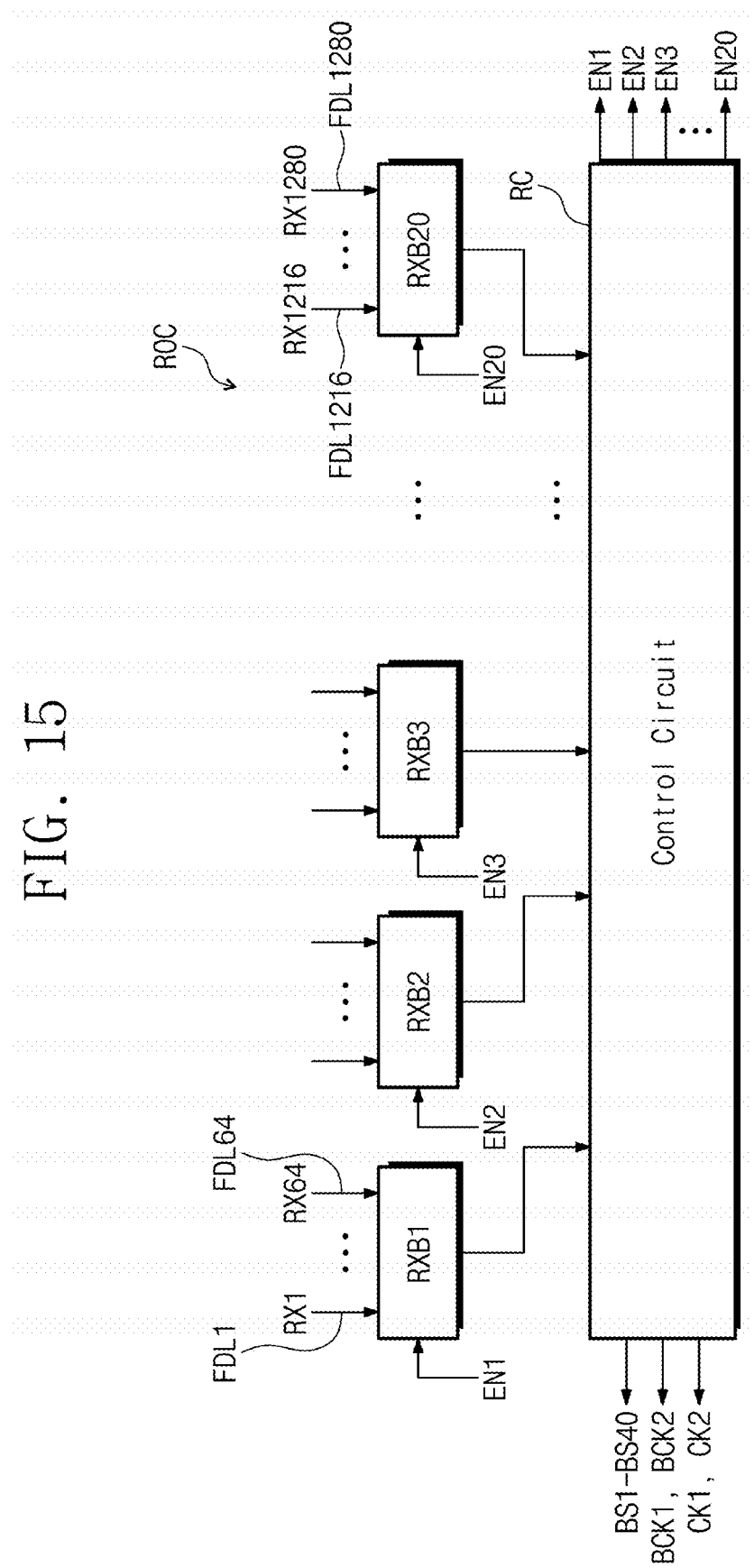
FIG. 15 is a block diagram illustrating an exemplary embodiment of a read-out circuit constructed according to principles of the invention.

FIG. 15 is a block diagram illustrating an exemplary embodiment of a read-out circuit constructed according to principles of the invention.

As shown in FIG. 15, the read-out circuit ROC includes read-out blocks RXB1 to RXB20 and a control circuit RC.

Referring to FIGS. 14A and 15, the number of read-out blocks RXB1 to RXB20 may be equal to the number of the columns of sensing units arranged in the first direction DR1. Each of the read-out blocks RXB1 to RXB20 receives fingerprint sensing signals from fingerprint sensing lines connected to a corresponding one of the sensing units. For example, the read-out block RXB1 receives fingerprint sensing signals RX1 to RX64 from the fingerprint sensing lines FDL1 to FDL64 connected to the sensing units SU11 to SU401 sequentially arranged in the second direction DR2. The read-out block RXB20 receives the fingerprint sensing signals RX1216 to RX1280 from the fingerprint sensing lines FDL1216 to FDL1280 connected to the sensing units SU120 to SU4020 sequentially arranged in the second direction DR2.

The control circuit RC outputs enable signals EN1 to EN20 for selecting the read-out blocks RXB1 to RXB20 in response to the control signal from the control module CM. In an exemplary embodiment, the control circuit RC outputs a reception selection signal in response to the control signal from the control module CM, and each of the read-out blocks RXB1 to RXB20 receives the fingerprint sensing signal from the fingerprint sensing lines in a sensing unit included in the sensing area SA in response to the reception selection signal.

The control circuit RC outputs block selection signals BS1 to BS40, first and second block clock signals BCK1 and BCK2, and first and second clock signals CK1 and CK2 in response to the control signal from the control module CM.

In the example shown in FIG. 14B, when the sensing units SU54 to SU87 in the sensing area SA are selected, the control circuit RC activates only block selection signals BS5 to BS8 among the block selection signals BS1 to BS40 at a low level, and maintains the remaining block selection signals BS1 to BS4, and BS9 to BS40 a high-level inactive state.

Figure 16:
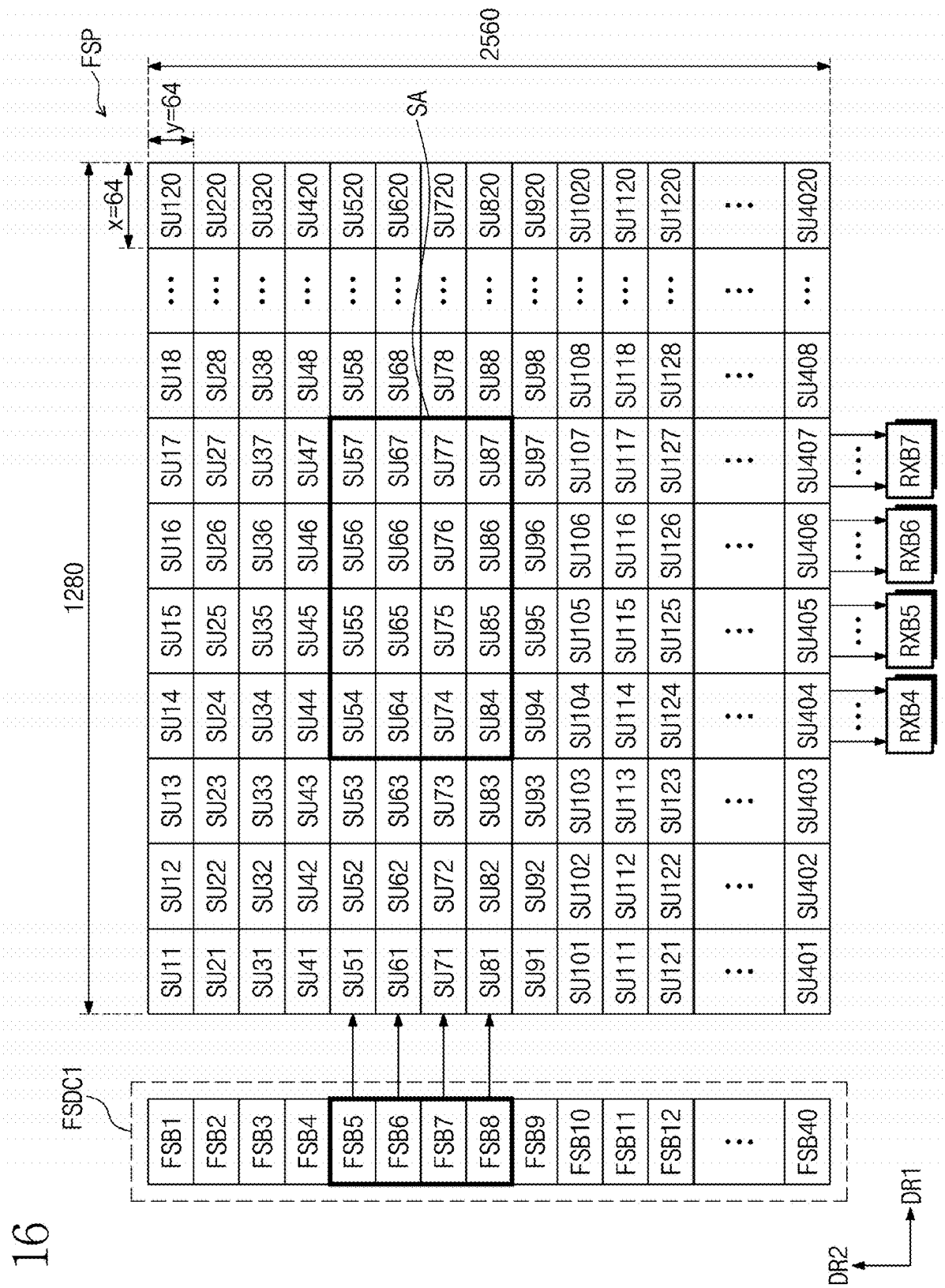
FIG. 16 is a block diagram illustrating an exemplary embodiment of read-out blocks receiving fingerprint sensing signals from fingerprint sensing lines in a sensing area of a fingerprint sensing panel constructed according to principles of the invention.

FIG. 16 is a block diagram illustrating an exemplary embodiment of read-out blocks receiving fingerprint sensing signals from fingerprint sensing lines in a sensing area of a fingerprint sensing panel constructed according to principles of the invention.

Referring to FIGS. 15 and 16, when the sensing units SU54 to SU87 in the sensing area SA are selected, only the enable signals EN4 to EN7 among the enable signals EN1 to EN20 may be activated to a predetermined level, and the remaining enable signals EN1 to EN3, and EN8 to EN20 may be maintained in the inactive state. In this case, the read-out blocks RXB4 to RXB7 (corresponding to the sensing area SA) among the read-out blocks RXB1 to RXB20 receive the fingerprint sensing signals from the fingerprint sensing lines and transmit the received fingerprint sensing signals to the control circuit RC. Thus, only the fingerprint sensing signals from the fingerprint sensing lines in the sensing area SA may be provided to the control module CM through the read-out blocks RXB4 to RXB7 and the control circuit RC. On the other hand, the read-out blocks RXB1 to RXB3 and RXB8 to RXB20 (which do not correspond to the sensing area SA), which receive the enable signals EN1 to EN3 and EN8 to EN20 are maintained in the inactive state. Thus, the power consumption in the read-out circuit ROC may be reduced.

According to this embodiment, by providing to the control module CM only the fingerprint sensing signals from the fingerprint sensing lines in the sensing area SA among the fingerprint sensing signals RX1 to RX1280 from the fingerprint sensing lines FDL1 to FDL1280, the number of signal lines between the read-out circuit ROC and the control module CM may be reduced. Moreover, the data processing amount required for the fingerprint authentication process in the control module CM may be minimized.

Figure 17:
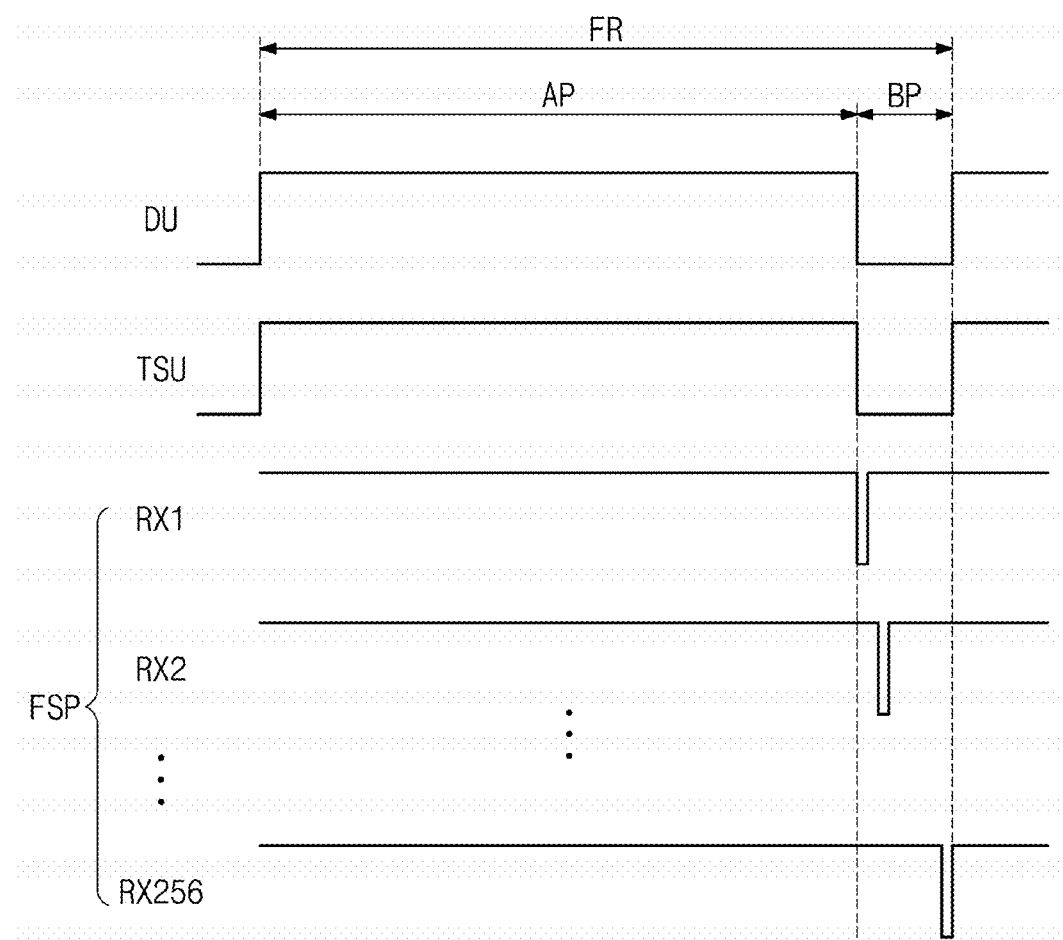
FIG. 17 is an exemplary embodiment of a timing diagram illustrating the operation of an electronic device constructed according to principles of the invention.

FIG. 17 is an exemplary embodiment of a timing diagram illustrating the operation of an electronic device constructed according to principles of the invention.

Referring to FIGS. 12 and 17, the panel driving circuit PDC may operate so that a new image is displayed on the display unit DU every frame FR. One frame FR includes an active period AP and a blank period BP. In the active period AP, the panel driving circuit PDC transmits an image signal and synchronization signals (for example, a scan start signal, a horizontal synchronization signal, a clock signal, and the like) to the display unit DU. In the blank period BP, the panel driving circuit PDC does not transmit the image signal to the display unit DU.

The touch sensing circuit TSC may receive the touch signal from the touch sensing unit TSU in the active period AP.

The control module CM according to an exemplary embodiment may control the read-out circuit ROC in synchronization with the synchronization signals of the panel driving circuit PDC. The read-out circuit ROC provides the block selection signal B S1 to BSk, the first and second block clock signals BCK1 and BCK2, and the first and second clock signals CK1 and CK2 to the fingerprint sensing panel FSP during the active period AP, and receives the fingerprint sensing signals RX1 to RX256 from the fingerprint sensing panel FSP during the blank period BP. In the example shown in FIGS. 14B and 15, since the sensing area SA includes four sensing units in the first direction DR1, during the blank period BP, the read-out circuit ROC may receive a total of 256 fingerprint sensing signals RX1 to RX256 from the fingerprint sensing panel FSP.

Since the read-out circuit ROC receives the fingerprint sensing signals RX1 to RX256 of the fingerprint sensing panel FSP during the blank period BP of the display unit DU and the touch sensing unit TSU, the noise image due to the interference of the fingerprint sensing signal with the image signal and the touch sensing signal may be minimized.

Figure 18A:
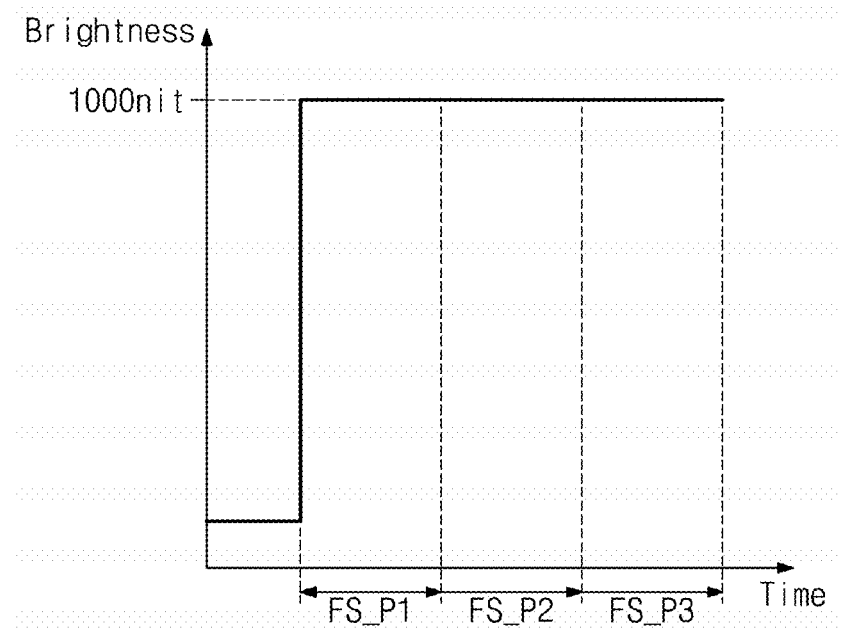
FIGS. 18A, 18B and 18C are graphs showing exemplary changes in the brightness of the light emitting area in a display unit constructed according to principles of the invention.
Figure 18B:
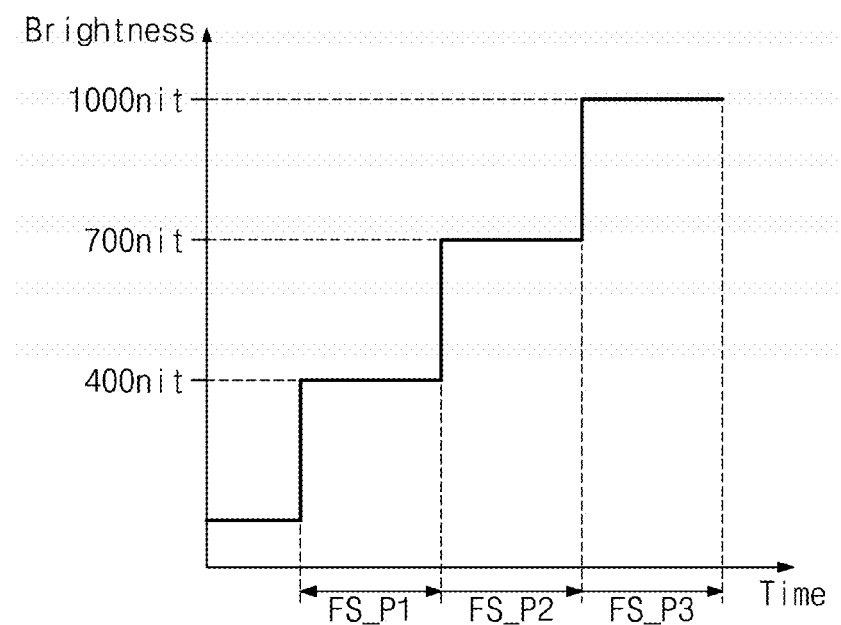
Figure 18C:
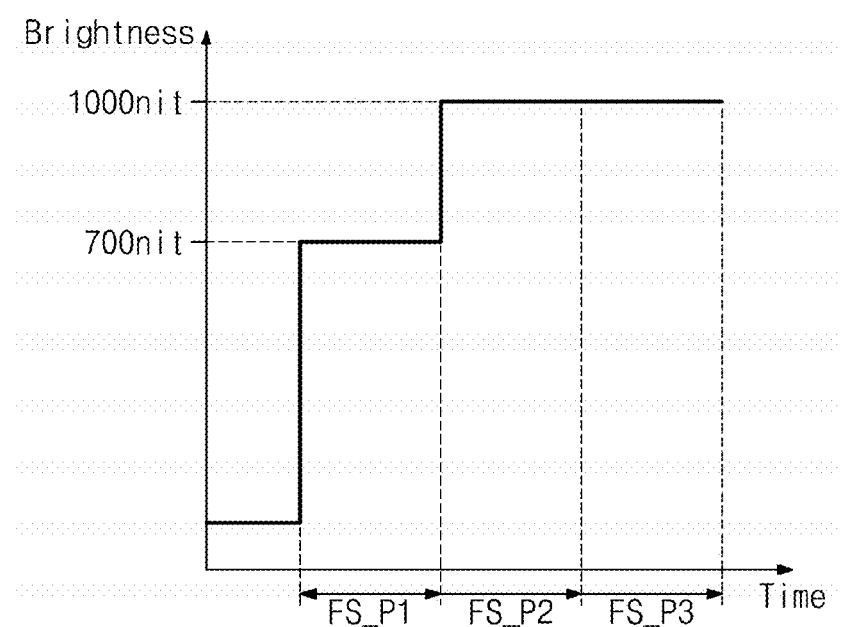

FIGS. 18A, 18B and 18C are graphs showing changes in the brightness of the light emitting area in a display unit constructed according to principles of the invention.

Referring to FIGS. 11, 12, and 18A, when the control module CM receives the touch sensing signal from the touch sensing circuit TSC, it controls the panel driving circuit PDC so that the brightness of the light emitting area EA corresponding to the touch area TA increases.

The photodiode PD of the fingerprint sensing pixel SPij in the fingerprint sensing panel FSP shown in FIG. 7 senses the amount of light reflected by the user's hand, which is the light emitted from the display unit DU, so that the user's fingerprint information may be sensed. As the brightness of the light emitted from the display unit DU is higher, the fingerprint sensing panel FSP may more accurately sense the difference in light reflected by a valley between the ridges of the fingerprint.

As shown in FIG. 18A, the control module CM may set the brightness of the light emitting area EA to the maximum level (e.g., 1000 nit). If the fingerprint sensing signal received from the fingerprint sensing panel FSP through the read-out circuit ROC does not match the preset fingerprint signal, the control module CM may repeat the fingerprint sensing process. The control module CM may maintain the brightness of the light emitting area EA at the maximum level (e.g., 1000 nit) in the first fingerprint sensing section FS_P1, the second fingerprint sensing section FS_P2 and the third fingerprint sensing section FS_P3.

As shown in FIG. 18B, the control module CM may raise the brightness of the light emitting area EA step by step. For example, the control module CM may raise the brightness of the light emitting area EA step by step to 400 nits in the first fingerprint sensing section FS_P1, 700 nits in the second fingerprint sensing section FS_P2, and 1000 nits in the third fingerprint sensing section FS_P3. In such a way, if the brightness of the light emitting area EA is increased, the power consumption may be reduced as compared with the example shown in FIG. 18A. The number of fingerprint sensing sections, the brightness increased level of the light emitting area EA, and the like are merely examples and it will be understood well that these may be variously changed.

As shown in FIG. 18C, the control module CM may raise the brightness of the light emitting area EA step by step, but may set the brightness increasing width irregularly. For example, the control module CM may raise the brightness of the light emitting area EA step by step to 700 nits in the first fingerprint sensing section FS_P1, 1000 nits in the second fingerprint sensing section FS_P2, and 1000 nits in the third fingerprint sensing section FS_P3.

As shown in FIGS. 18A to 18C, the control module CM may improve the fingerprint sensing performance of the fingerprint sensing panel FSP by raising the brightness of the light emitting area EA. Specifically, the fingerprint sensing performance of the fingerprint sensing panel FSP may be improved while varying the brightness of the light emitting area EA during the fingerprint sensing process and minimizing power consumption.

Figure 19A:
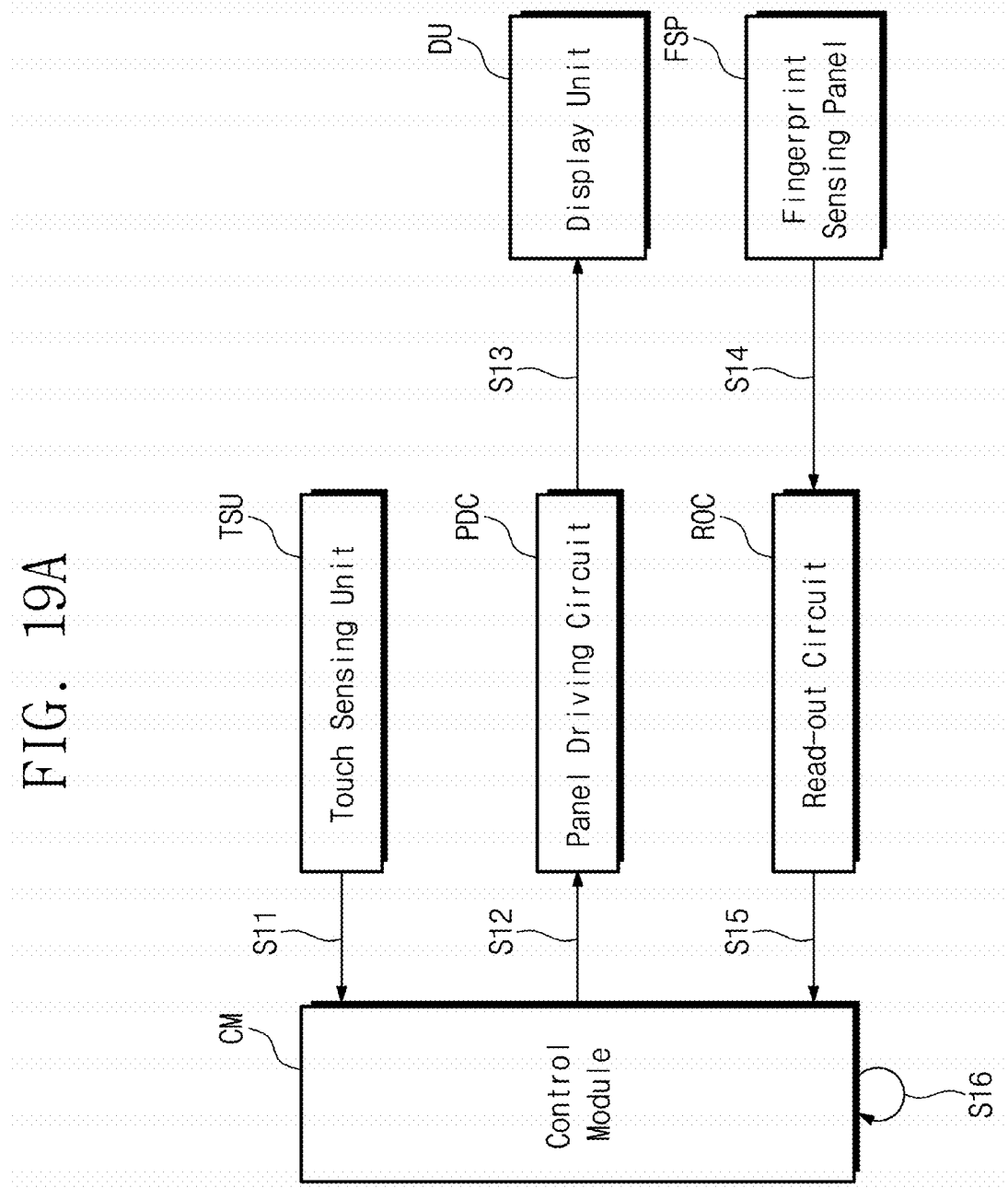
FIG. 19A is a block diagram illustrating an exemplary embodiment of a fingerprint sensing process of an electronic device constructed according to principles of the invention.

FIG. 19A is a block diagram illustrating an exemplary embodiment of a fingerprint sensing process of an electronic device constructed according to principles of the invention.

Referring to FIG. 19A, the control module CM receives a touch sensing signal from a touch sensing unit TSU (S11). The control module CM determines the touch area corresponding to the touch sensing signal from the touch sensing circuit TSC, and outputs a control signal for controlling the brightness of the light emitting area of the display unit DU corresponding to the touch area to the panel driving circuit PDC (S12).

The panel driving circuit PDC increases the brightness of the light emitting area of the display unit DU (S13).

The fingerprint sensing panel FSP provides the fingerprint sensing signal of the sensing area corresponding to the touch area to the read-out circuit ROC (S14).

The read-out circuit ROC provides a fingerprint sensing signal from the fingerprint sensing panel FSP to the control module CM (S15).

The control module CM performs an authentication process for comparing the fingerprint sensing signal from the read-out circuit ROC with the fingerprint signal stored in the memory MM shown in FIG. 2 (S16).

Figure 19B:
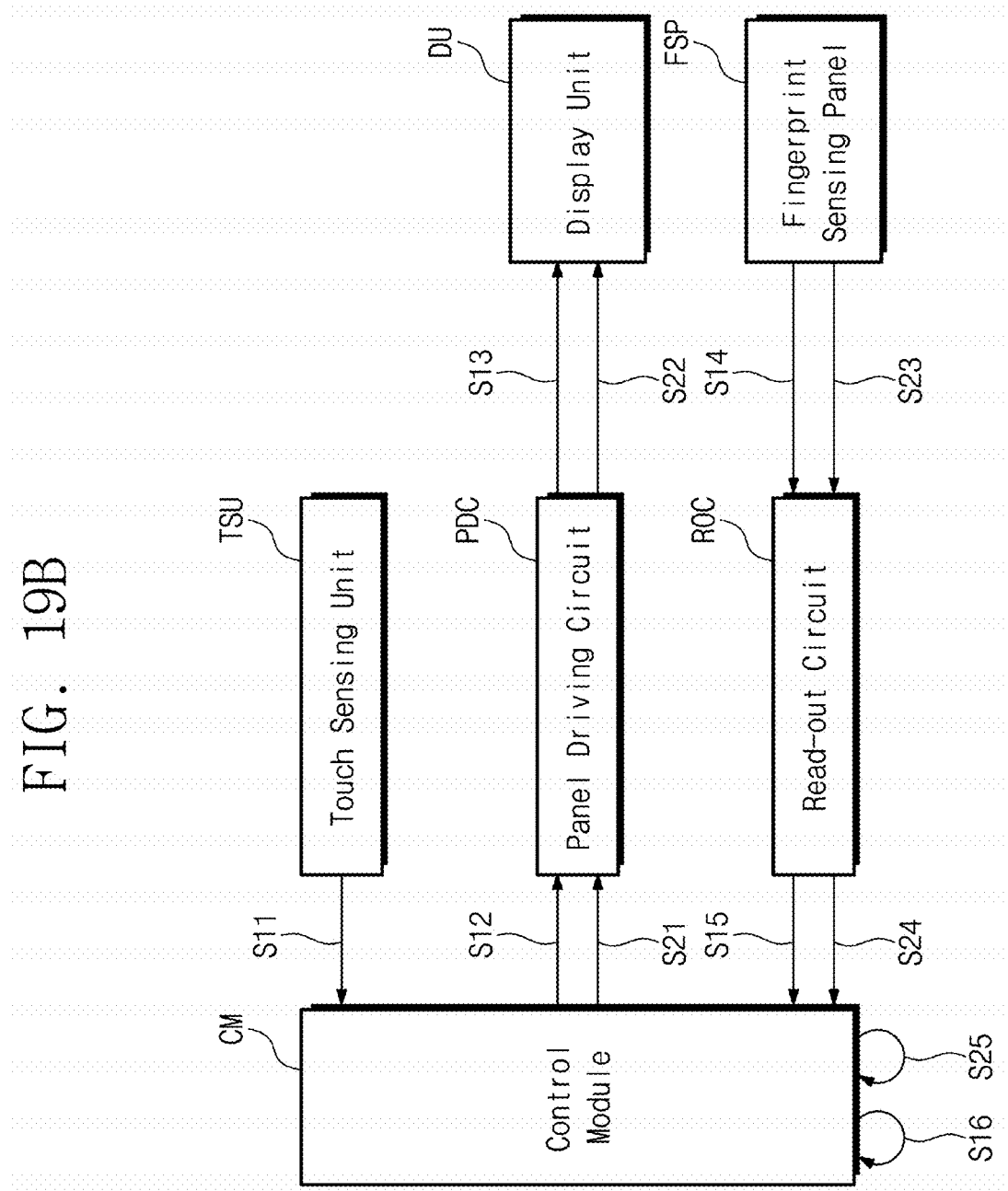
FIG. 19B is a block diagram illustrating an exemplary embodiment of a fingerprint sensing process of an electronic device when fingerprint authentication fails in the authentication process shown in FIG. 19A.

FIG. 19B is a block diagram illustrating an exemplary embodiment of a fingerprint sensing process of an electronic device when fingerprint authentication fails in the authentication process shown in FIG. 19A. In FIG. 19B, the processes S11 to S16 are the same as those in FIG. 19A, so repeated description is omitted to avoid redundancy.

Referring to FIG. 19B, if the fingerprint sensing signal from the read-out circuit ROC and the fingerprint signal stored in the memory MM shown in FIG. 2 are different (S16), the control module CM outputs a control signal for increasing the brightness of the light emitting area to the panel driving circuit PDC (S21). For example, the brightness of the light emitting area may be increased as shown in any one of FIGS. 18A to 18C.

The panel driving circuit PDC increases the brightness of the light emitting area of the display unit DU (S22).

The fingerprint sensing panel FSP provides the fingerprint sensing signal of the sensing area corresponding to the touch area to the read-out circuit ROC (S23).

The read-out circuit ROC provides a fingerprint sensing signal from the fingerprint sensing panel FSP to the control module CM (S24).

The control module CM performs an authentication process for comparing the fingerprint sensing signal from the read-out circuit ROC with the fingerprint signal stored in the memory MM shown in FIG. 2 (S25).

If the fingerprint sensing signal from the read-out circuit ROC and the fingerprint signal stored in the memory MM shown in FIG. 2 are different, the processes S21 to S25 may be performed again.

If the fingerprint authentication fails even after the authentication process is repeatedly performed a predetermined number of times, the control module CM may determine the user providing the fingerprint as an unauthorized user.

Figure 20A:
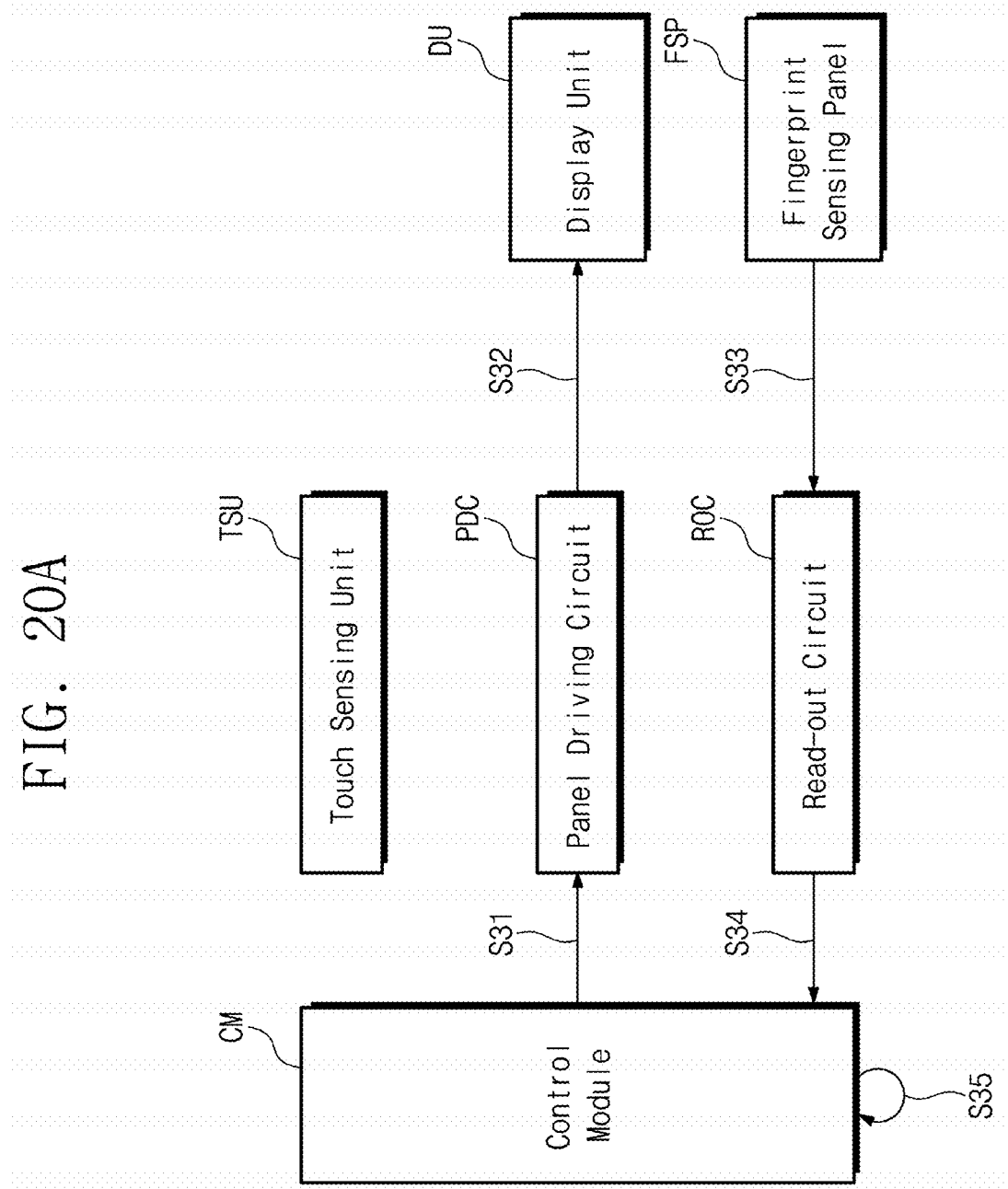
FIG. 20A is a block diagram illustrating an exemplary embodiment of a fingerprint sensing process of an electronic device constructed according to principles of the invention.

FIG. 20A is a block diagram illustrating an exemplary embodiment of a fingerprint sensing process of an electronic device constructed according to principles of the invention.

Referring to FIG. 20A, the control module CM may know the touch area in advance. For example, the application program for Internet banking may set the fingerprint authentication position to a predetermined area of the electronic device, and notify the fingerprint authentication position information to the control module CM. In this case, the control module CM does not receive the touch sensing signal from the touch sensing unit TSU.

The control module CM outputs a control signal for controlling the brightness of the light emitting area of the display unit DU corresponding to the previously known touch area to the panel driving circuit PDC (S31).

The panel driving circuit PDC increases the brightness of the light emitting area of the display unit DU (S32).

The fingerprint sensing panel FSP provides the fingerprint sensing signal of the sensing area corresponding to the touch area to the read-out circuit ROC (S33).

The read-out circuit ROC provides a fingerprint sensing signal from the fingerprint sensing panel FSP to the control module CM (S34).

The control module CM performs an authentication process for comparing the fingerprint sensing signal from the read-out circuit ROC with the fingerprint signal stored in the memory MM shown in FIG. 2 (S35).

Figure 20B:
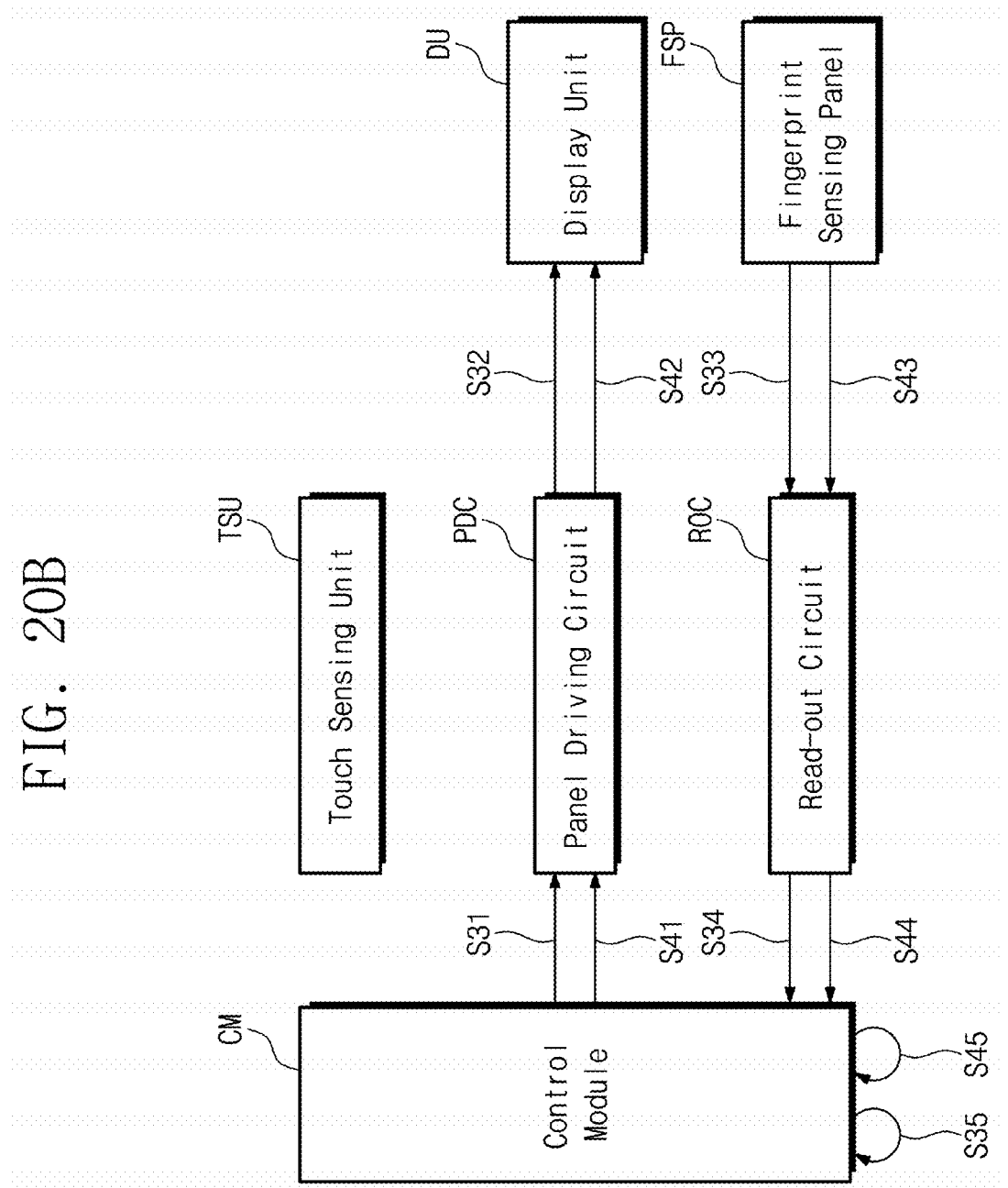
FIG. 20B is a block diagram illustrating an exemplary embodiment of a fingerprint sensing process of an electronic device when fingerprint authentication fails in the authentication process shown in FIG. 20A.

FIG. 20B is a block diagram illustrating an exemplary embodiment of a fingerprint sensing process of an electronic device when fingerprint authentication fails in the authentication process shown in FIG. 20A. In FIG. 20B, the processes S31 to S35 are the same as those in FIG. 20A, so that description is omitted to avoid redundancy.

Referring to FIG. 20B, if the fingerprint sensing signal from the read-out circuit ROC and the fingerprint signal stored in the memory MM shown in FIG. 2 are different (S35), the control module CM outputs a control signal for increasing the brightness of the light emitting area to the panel driving circuit PDC (S41). For example, the brightness of the light emitting area may be increased as shown in any one of FIGS. 18A to 18C.

The panel driving circuit PDC increases the brightness of the light emitting area of the display unit DU (S42).

The fingerprint sensing panel FSP provides the fingerprint sensing signal of the sensing area corresponding to the touch area to the read-out circuit ROC (S43).

The read-out circuit ROC provides a fingerprint sensing signal from the fingerprint sensing panel FSP to the control module CM (S44).

The control module CM performs an authentication process for comparing the fingerprint sensing signal from the read-out circuit ROC with the fingerprint signal stored in the memory MM shown in FIG. 2 (S45).

If the fingerprint sensing signal from the read-out circuit ROC and the fingerprint signal stored in the memory MM shown in FIG. 2 are different, the processes S41 to S45 may be performed again.

If the fingerprint authentication fails even after the authentication process is repeatedly performed a predetermined number of times, the control module CM may determine the user providing the fingerprint as an unauthorized user.

Figure 21A:
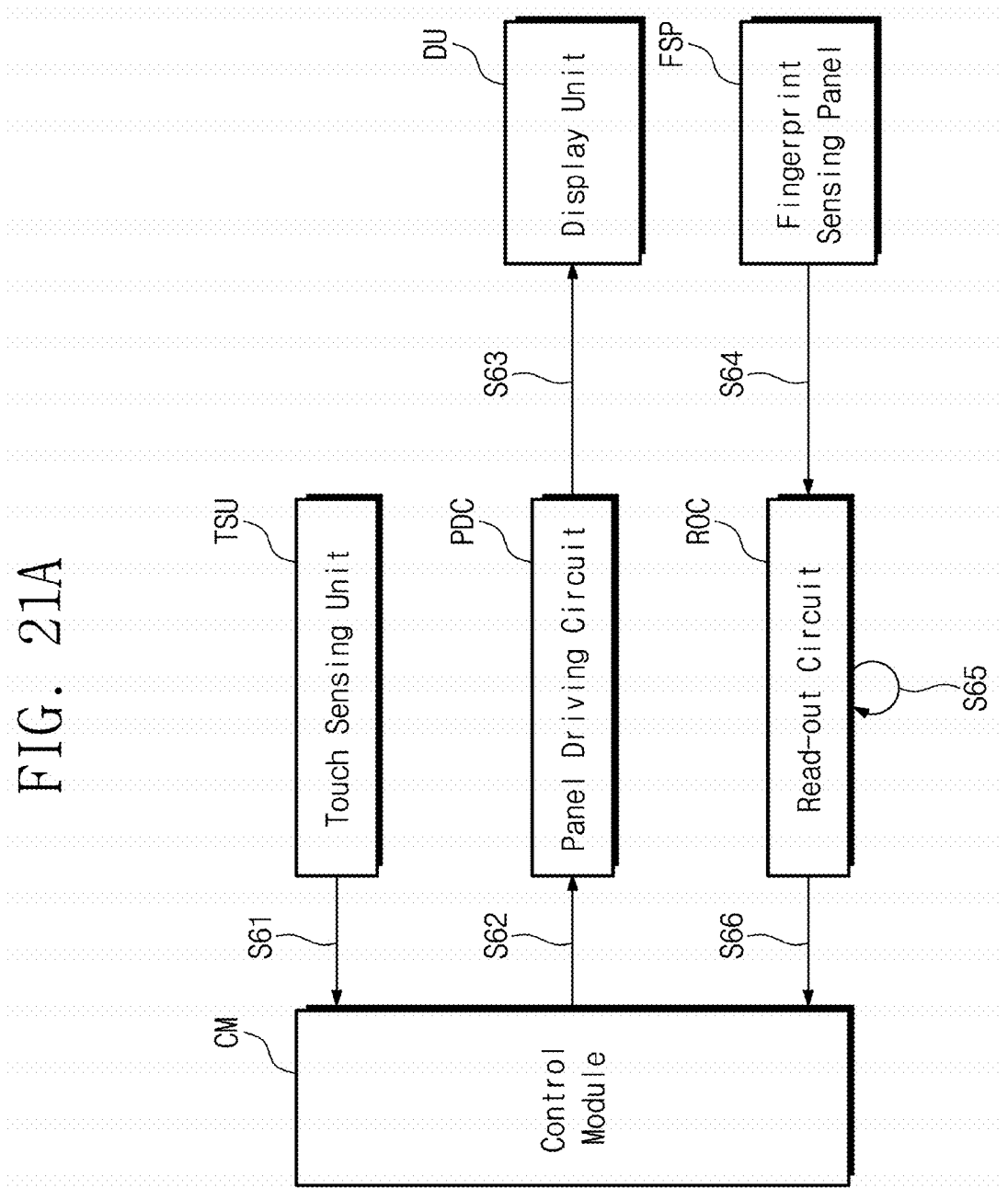
FIG. 21A is a block diagram illustrating an exemplary embodiment of a fingerprint sensing process of an electronic device constructed according to principles of the invention.

FIG. 21A is a block diagram illustrating an exemplary embodiment of a fingerprint sensing process of an electronic device constructed according to principles of the invention.

The processes S61 to S64 of the electronic device shown in FIG. 21A operate in the same manner as the processes S11 to S14 shown in FIG. 19A. The control module CM of the electronic device shown in FIG. 19A performs an authentication process for comparing the fingerprint sensing signal from the read-out circuit ROC with the fingerprint signal stored in the memory MM shown in FIG. 2 (S16).

Unlike the process S16 shown in FIG. 19A, the read-out circuit ROC shown in FIG. 21A performs an authentication process of comparing a fingerprint sensing signal from a fingerprint sensing panel FSP with a fingerprint signal stored in an internal memory (S65).

The read-out circuit ROC provides the result of the authentication process to the control module CM (S66).

Figure 21B:
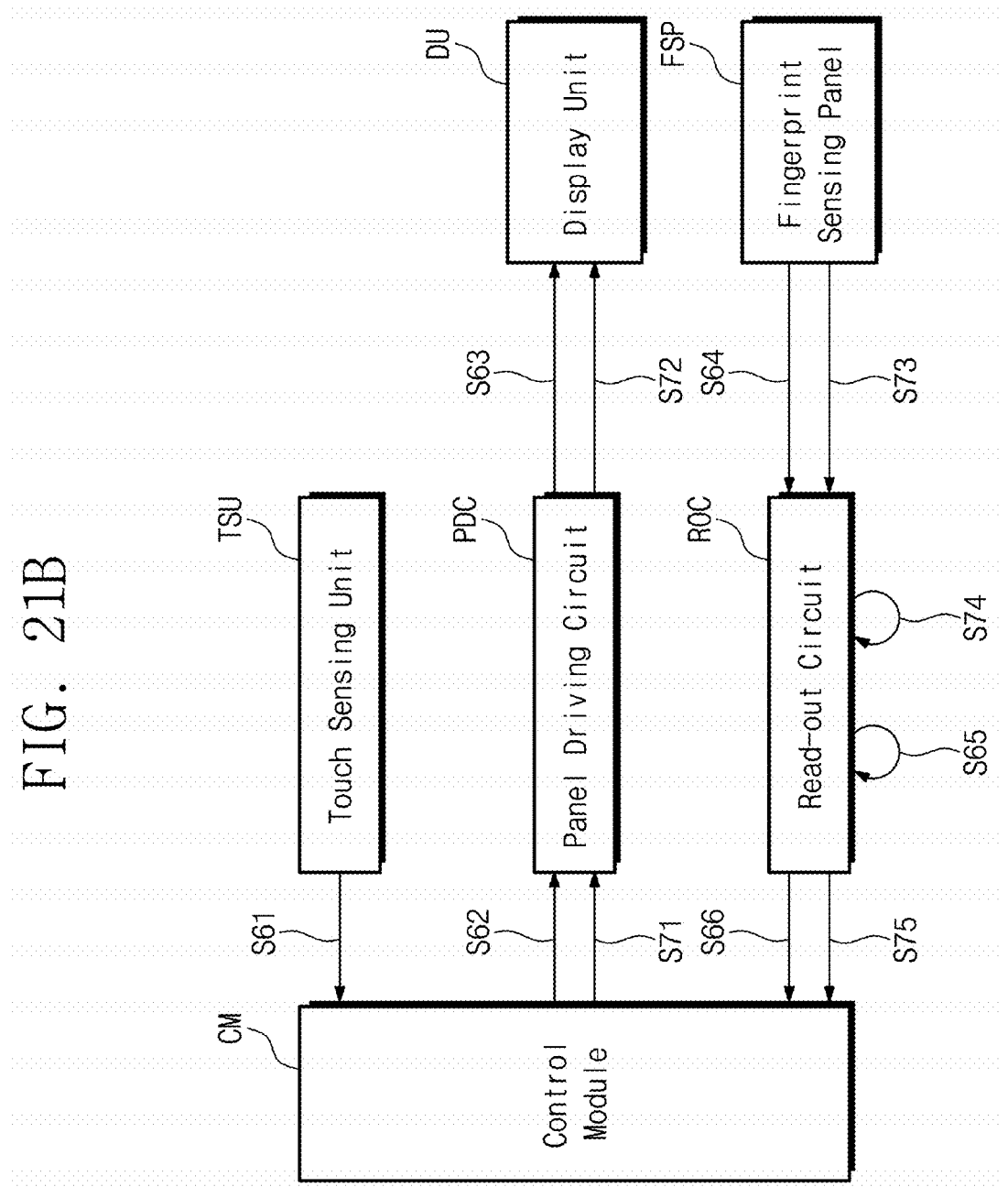
FIG. 21B is a block diagram illustrating an exemplary embodiment of a fingerprint sensing process of an electronic device when fingerprint authentication fails in the authentication process shown in FIG. 21A.

FIG. 21B is a block diagram illustrating an exemplary embodiment of a fingerprint sensing process of an electronic device when fingerprint authentication fails in the authentication process shown in FIG. 21A. In FIG. 21B, the processes S61 to S66 are the same as those in FIG. 21A, so that description is omitted to avoid redundancy.

Referring to FIG. 21B, when a signal indicating that the fingerprint authentication fails is received from the read-out circuit ROC (S66), the control module CM outputs a control signal for increasing the brightness of the light emitting area to the panel driving circuit PDC (S71). For example, the brightness of the light emitting area may be increased as shown in any one of FIGS. 18A to 18C.

The panel driving circuit PDC increases the brightness of the light emitting area of the display unit DU (S72).

The fingerprint sensing panel FSP provides the fingerprint sensing signal of the sensing area corresponding to the touch area to the read-out circuit ROC (S73).

The read-out circuit ROC performs an authentication process of comparing a fingerprint sensing signal from a fingerprint sensing panel FSP with a fingerprint signal stored in an internal memory (S74).

The read-out circuit ROC provides the result of the authentication process to the control module CM (S75).

If the fingerprint authentication fails even after the authentication process is repeatedly performed a predetermined number of times, the control module CM may determine the user providing the fingerprint as an unauthorized user.

Display devices constructed according to the principles and exemplary u) embodiments of the invention may sense a fingerprint on substantially the entire front surface of the display device. The electronic device may increase the brightness of the display area corresponding to the sensing area, thereby improving the fingerprint recognition performance. Also, the signal processing amount may be minimized by receiving a fingerprint sensing signal from the sensing area corresponding to the user's touch area.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a plurality of pixels configured to display an image;
a touch sensing unit configured to sense an external input;
a fingerprint sensing unit comprising a plurality of fingerprint sensing pixels respectively connected to a plurality of fingerprint scan lines and a plurality of fingerprint sensing lines;
a fingerprint scan driving circuit comprising a plurality of scan blocks; and
a read-out circuit configured to output a clock signal and a plurality of block selection signals,
wherein:
each of the plurality of scan blocks outputs a plurality of fingerprint scan signals to corresponding fingerprint scan lines among the plurality of fingerprint scan lines in response to the clock signal and a received block selection signal among the plurality of block selection signals,
each of the scan blocks sequentially outputs the plurality of fingerprint scan signals to an active level when the received block selection signal is in an active state; and
each of the scan blocks outputs the plurality of fingerprint scan signals to an inactive level when the received block selection signal is in an inactive state.

2. The display device of claim 1, wherein each of the plurality of scan blocks comprises:
a plurality of switching elements respectively corresponding to some fingerprint scan lines among the plurality of fingerprint scan lines; and
a plurality of stages respectively corresponding to some fingerprint scan lines to output a fingerprint scan signal to a corresponding fingerprint scan line in response to a clock signal and an input signal;
a first switching element configured to transfer a block selection signal to the input signal of a corresponding stage in response to a block clock signal; and
an h-th switching element, where h is a positive integer greater than 1, configured to transfer a fingerprint scan signal outputted from a (h−1)-th stage to the input signal of corresponding stages in response to the block clock signal.

3. The display device of claim 1, wherein the read-out circuit receives a fingerprint sensing signal from one of the plurality of fingerprint sensing lines.

4. The display device of claim 3, wherein the read-out circuit comprises:
a control circuit to output a plurality of enable signals; and
a plurality of read-out blocks respectively corresponding to the plurality of fingerprint sensing pixels arranged in a first direction;
wherein each of the plurality of read-out blocks receives the fingerprint sensing signal corresponding to one among the plurality of fingerprint sensing pixels in response to a corresponding one among the plurality of enable signals.

5. The display device of claim 1, further comprising a plurality of scan lines and a plurality of data lines respectively connected to the plurality of pixels,
wherein:
one frame comprises an active period and a blank period; and
the plurality of scan lines are sequentially driven during the active period.

6. An electronic device comprising:
a display unit including a plurality of pixels;
a display driving circuit configured to drive the display unit;
a touch sensing unit configured to sense an external input;
a touch sensing circuit configured to drive the touch sensing unit;
a fingerprint sensing unit comprising a plurality of fingerprint sensing pixels respectively connected to a plurality of fingerprint scan lines and a plurality of fingerprint sensing lines;
a fingerprint scan driving circuit comprising a plurality of scan blocks;
a read-out circuit configured to output a clock signal and a plurality of block selection signals, and receive a fingerprint sensing signal from the fingerprint sensing unit; and
a control module to control the display driving circuit, the touch sensing circuit, and the read-out circuit,
wherein:
when a touch sensing signal corresponding to an arbitrary touch area is received from the touch sensing circuit, the control module controls the display driving circuit so that a brightness of a light emitting area of the display unit becomes a predetermined level, and
controls the read-out circuit to sense a fingerprint from a sensing area of the fingerprint sensing unit;
the touch area, the light emitting area, and the sensing area overlap each other;
each of the plurality of scan blocks outputs a plurality of fingerprint scan signals to corresponding fingerprint scan lines among the plurality of fingerprint scan lines in response to the clock signal and a received block selection signal among the plurality of block selection signals;
each of the scan blocks sequentially outputs the plurality of fingerprint scan signals to an active level when the received block selection signal is active state; and
each of the scan blocks outputs the plurality of fingerprint scan signals to an inactive level when the received block selection signal is in an inactive state.

7. The electronic device of claim 6, wherein the read-out circuit is configured to output the plurality of block selection signals to select the sensing area and to receive the fingerprint sensing signal from fingerprint sensing lines included in the sensing area.

8. The electronic device of claim 6, wherein the read-out circuit is configured to perform an authentication process to compare the fingerprint sensing signal with a stored fingerprint signal, and to provide an authentication result to the control module.

9. The electronic device of claim 6, wherein:
the display unit further comprises a plurality of scan lines and a plurality of data lines respectively connected to the plurality of pixels;
one frame comprises an active period and a blank period; and
the plurality of scan lines are sequentially driven during the active period.

10. The electronic device of claim 6, wherein the control module is configured to receive a fingerprint signal from the read-out circuit and to perform an authentication process to compare the fingerprint signal with a stored fingerprint signal.

11. The electronic device of claim 10, wherein:
the control module controls a brightness of the light emitting area to a first level when the touch sensing signal is received; and
the control module controls a brightness of the light emitting area to a second level higher than the first level when the fingerprint signal received from the read-out circuit and the stored fingerprint signal are different from each other.

12. A method of operating an electronic device including a touch sensing unit, a display unit, and a fingerprint sensing touch, the method comprising the steps of:
receiving a touch sensing signal from the touch sensing unit;
defining a touch area corresponding to the touch sensing signal;
increasing a light emission brightness of a light emitting area of the display unit corresponding to the touch area;
generating a first block selection signal to select a sensing area of a fingerprint sensing unit corresponding to the touch area;
generating a second block selection signal for a non-sensing area of the fingerprint sensing unit;
driving a fingerprint scan line connected to a fingerprint sensing pixel in the sensing area of the fingerprint sensing unit in response to the first block selection signal;
driving a fingerprint scan line connected to a fingerprint sensing pixel in the non-sensing area of the fingerprint sensing unit in an inactive state in response to the second block selection signal; and
receiving a fingerprint sensing signal from the sensing area.

13. The method of claim 12, further comprising the step of comparing the fingerprint sensing signal with a preset fingerprint signal.

14. The method of claim 13, further comprising:
when the fingerprint sensing signal and the preset fingerprint signal are different from each other, increasing a light emission brightness of a light emitting area corresponding to the touch area of the display unit;
generating a block selection signal to sense the sensing area corresponding to the touch area of the fingerprint sensing unit; and
receiving a new fingerprint sensing signal from the sensing area of the fingerprint sensing unit.

15. The method of claim 14, wherein:
the display unit comprises a plurality of pixels, a plurality of scan lines and a plurality of data lines; and
the plurality of scan lines are sequentially driven during an active period.

* * * * *